United States Patent
Oosake

(10) Patent No.: US 12,433,472 B2
(45) Date of Patent: Oct. 7, 2025

(54) MEDICAL IMAGE PROCESSING APPARATUS, MEDICAL IMAGE PROCESSING METHOD, AND PROGRAM

(71) Applicant: FUJIFILM Corporation, Tokyo (JP)

(72) Inventor: Masaaki Oosake, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 63 days.

(21) Appl. No.: 18/505,029

(22) Filed: Nov. 8, 2023

(65) Prior Publication Data
US 2024/0074638 A1 Mar. 7, 2024

Related U.S. Application Data

(63) Continuation of application No. PCT/JP2022/021052, filed on May 23, 2022.

(30) Foreign Application Priority Data

Jun. 16, 2021 (JP) ................................ 2021-100119

(51) Int. Cl.
*A61B 1/00* (2006.01)
*G06V 10/82* (2022.01)
*G06V 20/50* (2022.01)

(52) U.S. Cl.
CPC ........ *A61B 1/00009* (2013.01); *A61B 1/0002* (2013.01); *A61B 1/0005* (2013.01);
(Continued)

(58) Field of Classification Search
CPC . A61B 1/00009; A61B 1/0002; A61B 1/0005; G06V 10/82; G06V 20/50; G06V 2201/031
See application file for complete search history.

(56) References Cited

U.S. PATENT DOCUMENTS 10,278,615 B2 * 5/2019 Zhao ..................... A61B 5/066
12,232,813 B2 * 2/2025 Shiba ..................... A61B 3/14
(Continued)

FOREIGN PATENT DOCUMENTS

EP          3811845       4/2021
JP       2018139846       9/2018
(Continued)

OTHER PUBLICATIONS

Kamon Shumpe translation of i WO 2020162275 Jan. 29, 2020 (Year: 2019).*
(Continued)

*Primary Examiner* — Zaihan Jiang
(74) *Attorney, Agent, or Firm* — JCIPRNET

(57) ABSTRACT

A medical image processing apparatus includes a processor configured to perform: a first determination process of determining, based on an acquired medical image, whether any of a plurality of imaging target sites is included in the medical image; a second determination process of determining, if it is determined in the first determination process that any of the plurality of imaging target sites is included in the medical image, whether the medical image is an image satisfying a determination criterion of a site included in the medical image; and a display control process of displaying, if it is determined in the second determination process that the medical image is the image satisfying the determination criterion of the site included in the medical image, a notification indicator on a display unit, the notification indicator indicating that the image satisfying the determination criterion of the site included in the medical image is captured.

20 Claims, 19 Drawing Sheets

(52) U.S. Cl.
CPC .............. *G06V 10/82* (2022.01); *G06V 20/50* (2022.01); *G06V 2201/031* (2022.01)

(56) References Cited

U.S. PATENT DOCUMENTS

| | | | |
|---|---|---|---|
| 2010/0030022 A1* | 2/2010 | Graumann | A61B 6/4441 382/128 |
| 2011/0242301 A1* | 10/2011 | Morita | A61B 1/041 382/128 |
| 2018/0242818 A1 | 8/2018 | Kubo et al. | |
| 2019/0328472 A1* | 10/2019 | Tojo | A61B 17/3423 |
| 2020/0281449 A1* | 9/2020 | Yoshimura | A61B 90/361 |
| 2020/0294227 A1 | 9/2020 | Usuda | |
| 2021/0030476 A1* | 2/2021 | Nakashima | A61B 1/0004 |
| 2021/0153808 A1 | 5/2021 | Tada et al. | |
| 2021/0186314 A1* | 6/2021 | Hwang | A61B 1/0014 |
| 2022/0084194 A1 | 3/2022 | Kawabata | |
| 2022/0207722 A1* | 6/2022 | Kim | G06T 7/0014 |
| 2023/0181001 A1 | 6/2023 | Usuda | |
| 2023/0237658 A1* | 7/2023 | Ock | G06V 10/945 |

FOREIGN PATENT DOCUMENTS

| | | |
|---|---|---|
| JP | 2020146202 | 9/2020 |
| JP | 2021048927 | 4/2021 |
| WO | 2019245009 | 12/2019 |
| WO | WO-2020162275 * | 1/2020 |
| WO | 2021024301 | 2/2021 |

OTHER PUBLICATIONS

"International Search Report (Form PCT/ISA/210) of PCT/JP2022/021052", mailed on Aug. 9, 2022, with English translation thereof, pp. 1-7.

"Written Opinion of the International Searching Authority (Form PCT/ISA/237) of PCT/JP2022/021052", mailed on Aug. 9, 2022, with English translation thereof, pp. 1-10.

Kenichi Goda, "Detection and Diagnosis of Early Neoplasms in Patients With Barrett's Esophagus by Conventional and Magnification Endoscopy", with English abstract thereof, Gastroenterological Endoscopy, vol. 60, Feb. 2018, pp. 158-173.

The Japanese Society of Gastrointestinal Cancer Screening, "2015 version of gastrointestinal endoscopy manual for population-based screening", Feb. 2016, pp. 1-115, available at: http://jsgcs.or.jp/files/uploads/inaishikyokenshin_manual_0405.pdf, with partial English translation thereof.

"Search Report of Europe Counterpart Application", issued on Aug. 20, 2024, pp. 1-9.

* cited by examiner

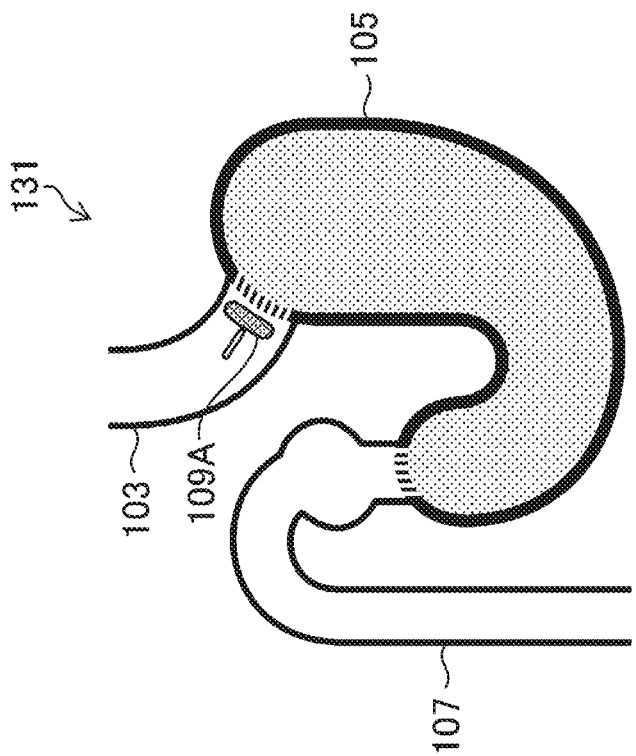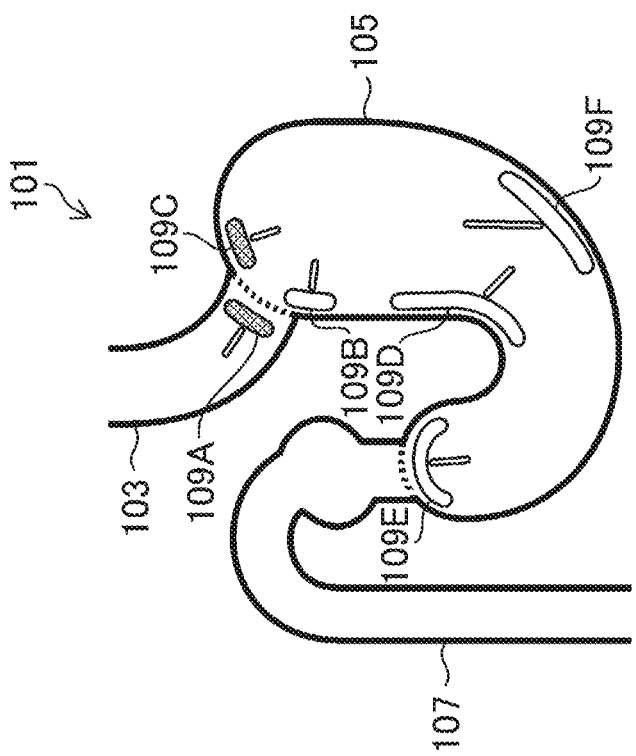
FIG. 16

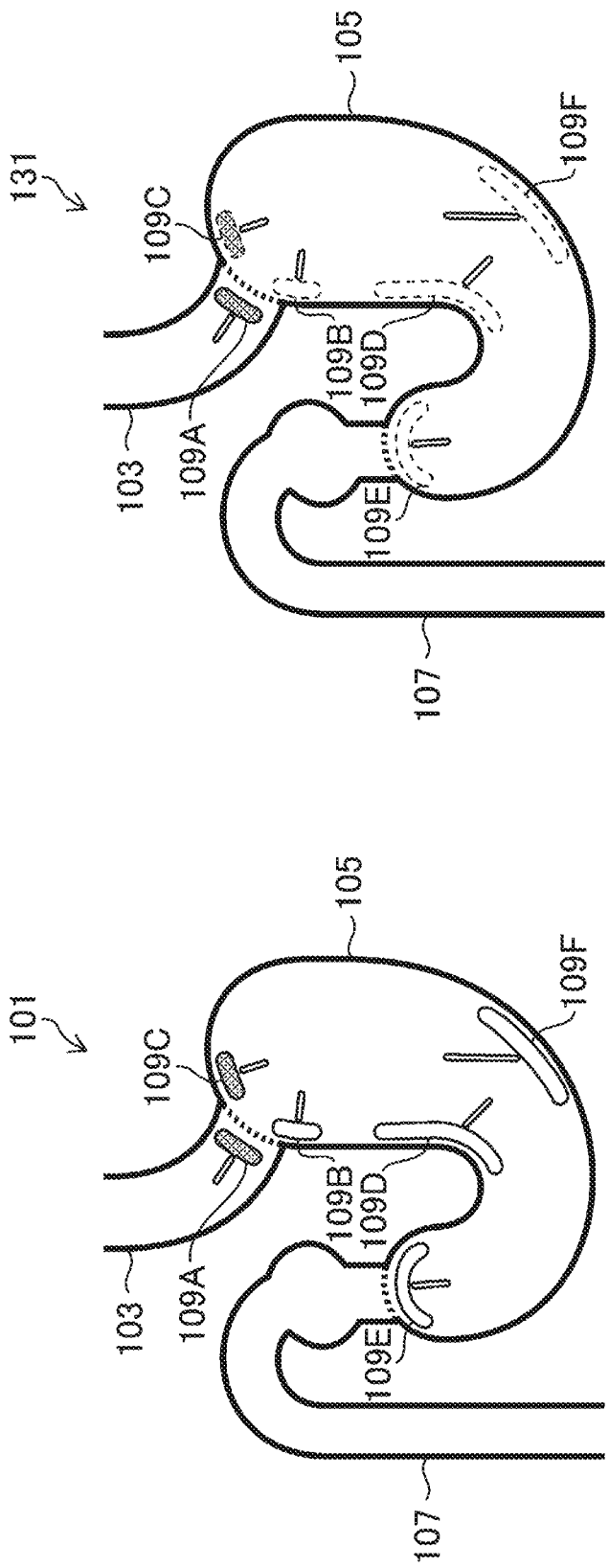

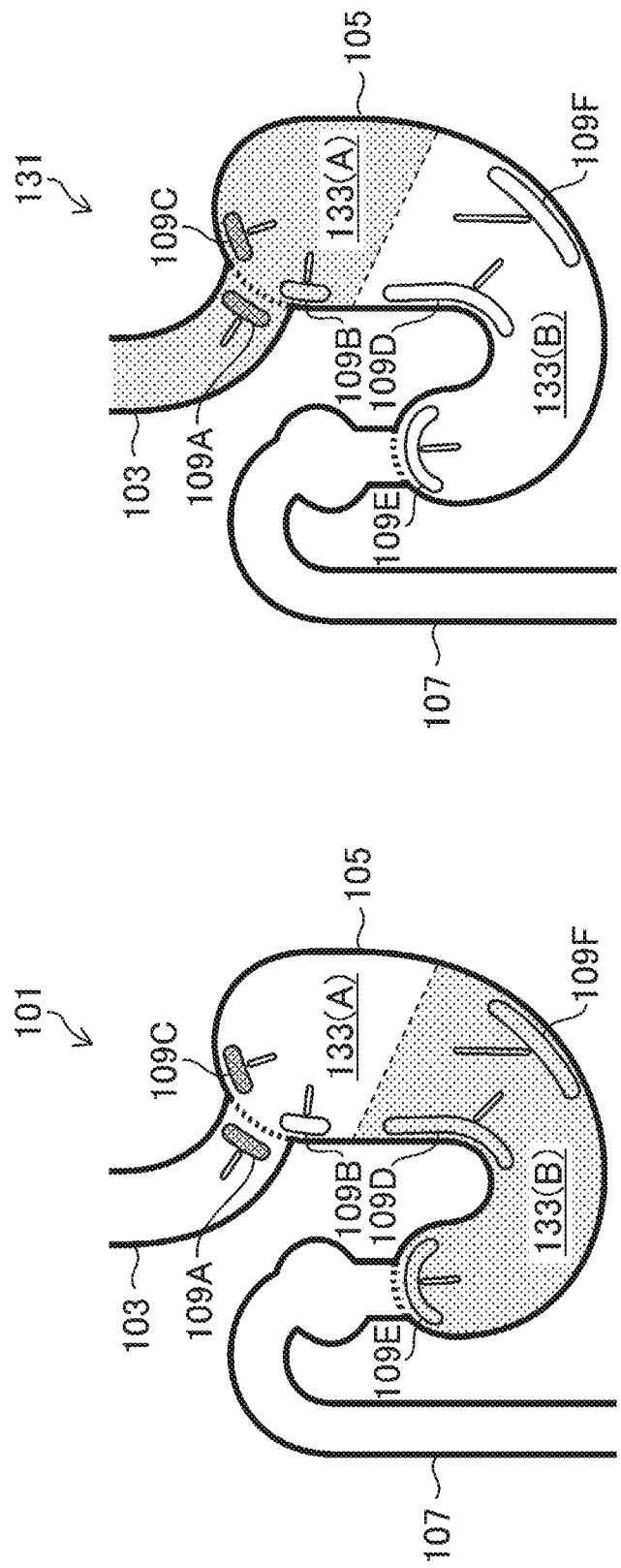

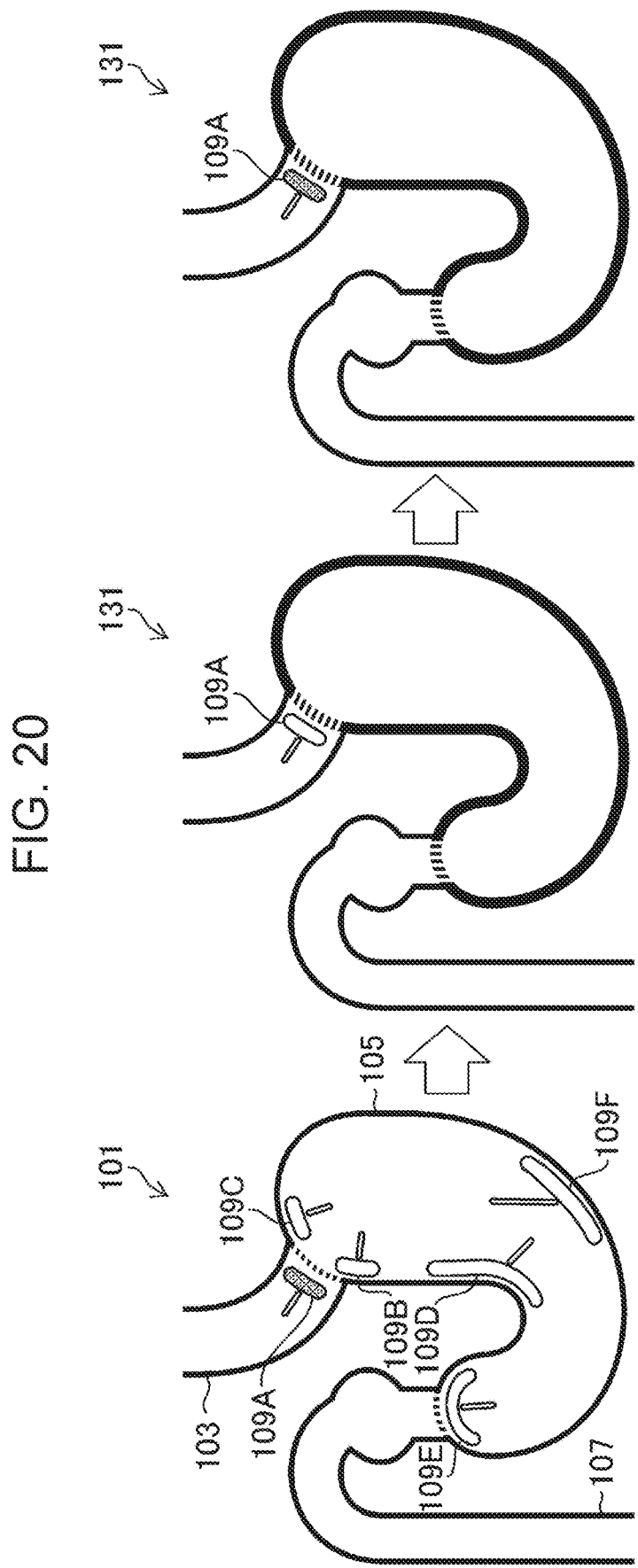

MEDICAL IMAGE PROCESSING APPARATUS, MEDICAL IMAGE PROCESSING METHOD, AND PROGRAM

CROSS-REFERENCE TO RELATED APPLICATIONS

The present application is a Continuation of PCT International Application No. PCT/JP2022/021052 filed on May 23, 2022 claiming priority under 35 U.S.C § 119(a) to Japanese Patent Application No. 2021-100119 filed on Jun. 16, 2021. Each of the above applications is hereby expressly incorporated by reference, in its entirety, into the present application.

BACKGROUND OF THE INVENTION

1. Field of the Invention

The present invention relates to a medical image processing apparatus, a medical image processing method, and a program.

2. Description of the Related Art

In recent years, an examination has been performed based on a medical image acquired by imaging an examination target with an endoscope system. Various techniques have been proposed to assist a user in imaging with the endoscope system.

In a technique described in JP2020-146202A, a technique of providing a notification of recognition results of a medical image in accordance with an operation of an operator (user) of the endoscope system has been proposed.

SUMMARY OF THE INVENTION

Here, imaging of an organ or the like, which is a subject, with the endoscope system needs to be performed in accordance with an imaging condition, a composition, or the like defined by a manual or the like, and is difficult depending on an imaging target site. In particular, it is very difficult for an inexperienced user to capture a desired medical image, and it may also be difficult to determine whether an appropriate medical image defined by a manual or the like is captured.

The present invention has been made in view of such circumstances, and an object of the present invention is to provide a medical image processing apparatus, a medical image processing method, and a program capable of efficiently acquiring a desired medical image.

A medical image processing apparatus according to an aspect of the present invention for achieving the above-described object is a medical image processing apparatus including a processor configured to perform: a first determination process of determining, based on an acquired medical image, whether any of a plurality of imaging target sites is included in the medical image; a second determination process of determining, if it is determined in the first determination process that any of the plurality of imaging target sites is included in the medical image, whether the medical image is an image satisfying a determination criterion of a site included in the medical image; and a display control process of displaying, if it is determined in the second determination process that the medical image is the image satisfying the determination criterion of the site included in the medical image, a notification indicator on a display unit, the notification indicator indicating that the image satisfying the determination criterion of the site included in the medical image is captured.

According to this aspect, if it is determined in the second determination process that the medical image is the image satisfying the determination criterion of the site included in the medical image, the notification indicator is displayed on the display unit, the notification indicator indicating that the image satisfying the determination criterion of the site included in the medical image is captured. Accordingly, in this aspect, it is possible to notify a user that a medical image satisfying a determination criterion set for each site is captured, and to efficiently acquire a desired medical image.

Preferably, in the display control process, the displaying of the notification indicator is maintained until the notification indicator for all the plurality of imaging target sites is displayed.

Preferably, in the second determination process, determination is performed based on the determination criterion different for each of the plurality of imaging target sites.

Preferably, the second determination process is performed based on a plurality of indices and is performed based on determination results using the plurality of indices.

Preferably, the plurality of indices include at least one of out-of-focus/blurring determination, brightness determination, boundary visibility determination, cardia visibility determination, cardia distance determination, peristalsis determination, fold determination, treatment determination, or composition determination.

Preferably, in the second determination process, determination is performed by a determiner different for each of the plurality of imaging target sites.

Preferably, the first determination process is performed based on a determination result of a first determiner constituted by a convolutional neural network, and at least a part of the second determination process is performed by inputting an intermediate feature amount acquired by the first determiner to a second determiner and outputting a determination result by the second determiner.

Preferably, the medical image is captured using a first light source or a second light source, and, in the first determination process, if determination is performed on the medical image captured using the first light source, the determination is performed on the plurality of imaging target sites, and if determination is performed on the medical image captured using the second light source, the determination is performed on an imaging target site selected from the plurality of imaging target sites.

Preferably, the medical image is an endoscopic image captured with an endoscope, and, in the display control process, a schematic diagram of a luminal organ imaged by the endoscope is displayed on the display unit, and the notification indicator is displayed on the schematic diagram.

Preferably, in the display control process, site indicators of the plurality of imaging target sites are displayed at corresponding positions on the schematic diagram.

Preferably, if it is determined in the second determination process that the medical image is the image satisfying the determination criterion of the site included in the medical image, in the display control process, the notification indicator is displayed by changing a display form of the site indicator for the site.

Preferably, in the display control process, a guide indicator for guiding imaging with the endoscope for capturing the medical image is displayed on the schematic diagram.

Preferably, the guide indicator has a stick shape, an imaging direction of the endoscope is indicated by a direction of the stick shape, and a distance of the endoscope from a subject is indicated by a length of the stick shape.

Preferably, the medical image is captured using a first light source or a second light source, and, in the display control process, if the medical image captured using the first light source is acquired, the schematic diagram is displayed in a first display mode, and if the medical image captured using the second light source is acquired, the schematic diagram is displayed in a second display mode.

Preferably, if it is determined in the second determination process that the medical image is an image satisfying the determination criterion of the site included in the medical image for all the plurality of imaging target sites, in the display control process, information is displayed on the display unit, the information indicating that imaging of all the imaging target sites is completed.

Preferably, the processor is configured to perform a storage process of storing the medical image in a memory if it is determined in the second determination process that the medical image is the image satisfying the determination criterion of the site included in the medical image.

Preferably, the plurality of imaging target sites are selected from at least an esophagogastric junction, a lesser curvature J-turn immediately below a cardia, a greater curvature U-turn immediately below the cardia, a lesser curvature posterior wall J-turn from an angulus or a lower body part, a pyloric ring from a prepyloric region, and a greater curvature in the lower body part from above.

Preferably, the plurality of imaging target sites are selected from at least a rectum, an anus, a splenic flexure, a hepatic flexure, a duodenal entrance, and ileocecal region.

A medical image processing method according to another aspect of the present invention is a medical image processing method for a medical image processing apparatus including a processor, the method including: performing, by the processor, a first determination step of determining, based on an acquired medical image, whether any of a plurality of imaging target sites is included in the medical image; a second determination step of determining, if it is determined in the first determination step that any of the plurality of imaging target sites is included in the medical image, whether the medical image is an image satisfying a determination criterion of a site included in the medical image; and a display control step of displaying, if it is determined in the second determination step that the medical image is the image satisfying the determination criterion of the site included in the medical image, a notification indicator on a display unit, the notification indicator indicating that the image satisfying the determination criterion of the site included in the medical image is captured.

A program according to another aspect of the present invention is a program for causing a medical image processing apparatus including a processor to execute a medical image processing method, the method including: performing, by the processor, a first determination step of determining, based on an acquired medical image, whether any of a plurality of imaging target sites is included in the medical image; a second determination step of determining, if it is determined in the first determination step that any of the plurality of imaging target sites is included in the medical image, whether the medical image is an image satisfying a determination criterion of a site included in the medical image; and a display control step of displaying, if it is determined in the second determination step that the medical image is the image satisfying the determination criterion of the site included in the medical image, a notification indicator on a display unit, the notification indicator indicating that the image satisfying the determination criterion of the site included in the medical image is captured.

According to the present invention, if it is determined in the second determination process that the medical image is the image satisfying the determination criterion of the site included in the medical image, the notification indicator is displayed on the display unit, the notification indicator indicating that the image satisfying the determination criterion of the site included in the medical image is captured. Thus, it is possible to notify the user that the medical image satisfying the determination criterion set for each site is captured, and to efficiently acquire the desired medical image.

BRIEF DESCRIPTION OF THE DRAWINGS

FIG. 16 is a diagram illustrating a schematic diagram in a case of using two different light sources;

FIG. 18 is a diagram illustrating a second example of the display variation;

FIG. 19 is a diagram illustrating a third example of the display variation; and

FIG. 20 is a diagram illustrating a fourth example of the display variation.

DESCRIPTION OF THE PREFERRED EMBODIMENTS

Figure 1:
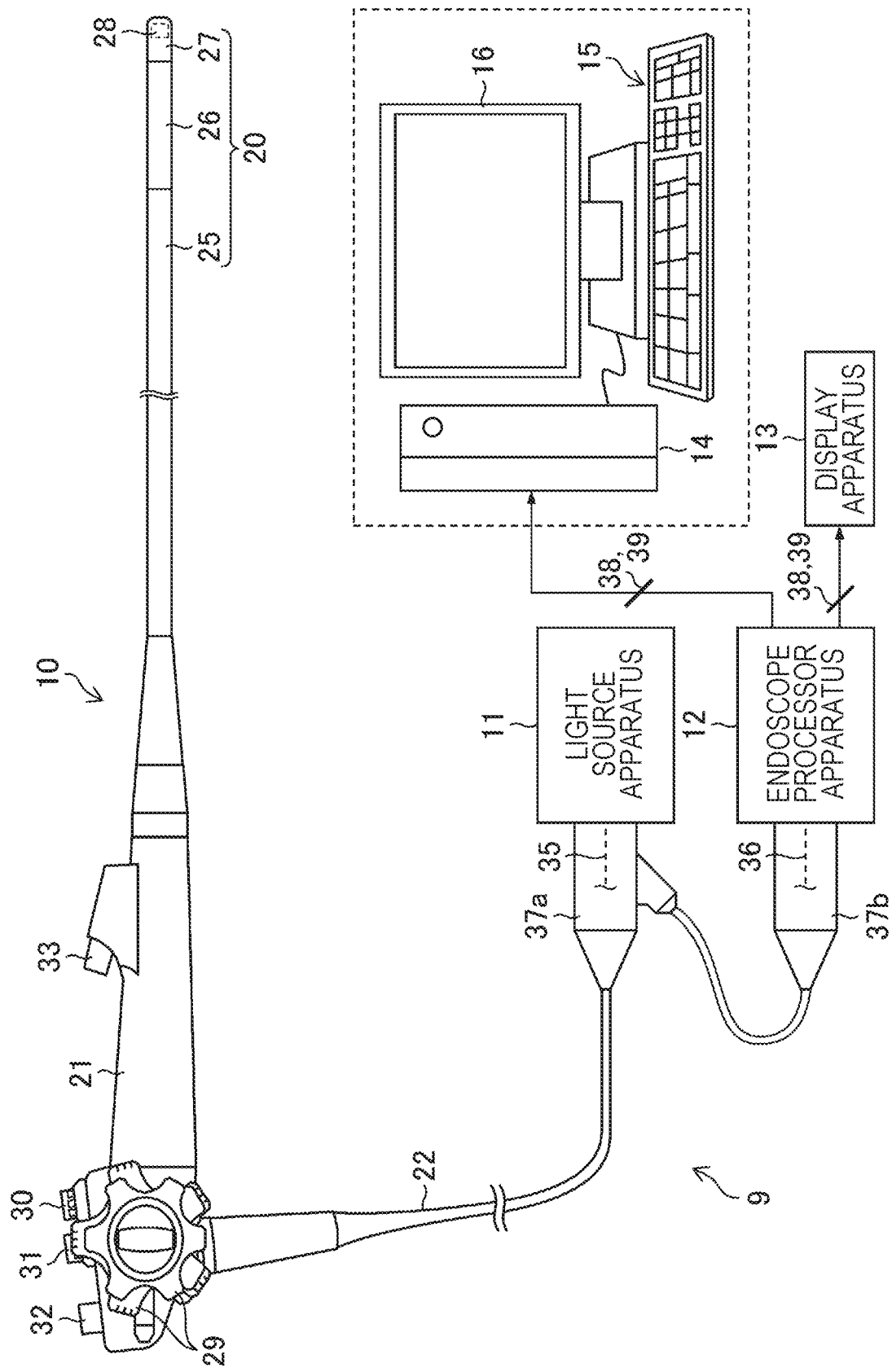
FIG. 1 is a schematic diagram illustrating an overall configuration of an endoscope system.

Hereinafter, preferred embodiments of a medical image processing apparatus, a medical image processing method, and a program according to the present invention will be described with reference to the accompanying drawings.
Overall Configuration of Endoscope System Including Medical Image Processing Apparatus FIG. 1 is a schematic diagram illustrating an overall configuration of an endoscope system including a medical image processing apparatus according to the present invention. A medical image input to a medical image processing apparatus 14 is captured with the endoscope system described below. In the following description, the medical image processing apparatus 14 included in the endoscope system will be described, but the embodiments of the present invention are not limited thereto. For example, a medical image captured with an endoscope system that is separate from the medical image processing apparatus 14 may be input to the medical image processing apparatus 14.

As illustrated in FIG. 1, an endoscope system 9 includes an endoscope 10, which is an electronic endoscope, a light source apparatus 11, an endoscope processor apparatus 12, a display apparatus 13, the medical image processing apparatus 14, an operating unit 15, and a display unit 16.

The endoscope 10 captures time-series medical images including a subject image and is, for example, a scope for a lower or upper digestive tract. The endoscope 10 has an insertion part 20, a handheld operating unit 21, and a universal cord 22. The insertion part 20 is inserted into a subject (for example, a stomach or a large intestine) and has a distal end and a proximal end. The handheld operating unit 21 is connected to the proximal end side of the insertion part 20 and is gripped by a doctor who is an operator to perform various operations. The universal cord 22 is connected to the handheld operating unit 21.

The entirety of the insertion part 20 is formed to have a small diameter and an elongated shape. The insertion part 20 is constituted by continuously providing, in order from the proximal end side to the distal end side thereof, a soft part 25, a bending part 26, and a tip part 27. The soft part 25 has flexibility. The bending part 26 can be bent by an operation of the handheld operating unit 21. In the tip part 27, an imaging optical system (objective lens), an imaging element 28, and the like, which are not illustrated, are incorporated.

The imaging element 28 is an imaging element of a complementary metal oxide semiconductor (CMOS) type or a charge coupled device (CCD) type. Image light of a site to be observed is incident on an imaging surface of the imaging element 28 through an observation window and the objective lens. The observation window, which is not illustrated, is open on a distal end surface of the tip part 27, and the objective lens, which is not illustrated, is disposed behind the observation window. The imaging element 28 captures (converts into an electric signal) the image light of the site to be observed incident on the imaging surface thereof, and outputs an image signal.

The handheld operating unit 21 is provided with various operating members operated by a user (who operates the endoscope system 9, such as a doctor). Specifically, the handheld operating unit 21 is provided with two types of bending operation knobs 29, an air/water supply button 30, and a suction button 31. The bending operation knobs 29 are used for a bending operation of the bending part 26. The air/water supply button 30 is for air supply/water supply operations. The suction button 31 is for a suction operation. The handheld operating unit 21 is further provided with a still image capturing instruction unit 32 and a treatment tool introduction port 33. The still image capturing instruction unit 32 is for issuing an instruction for capturing a still image 39 of the site to be observed. The treatment tool introduction port 33 is for inserting a treatment tool (not illustrated) into a treatment tool insertion path (not illustrated) penetrating through the insertion part 20.

The universal cord 22 is a connection cord for connecting the endoscope 10 to the light source apparatus 11. The universal cord 22 contains a light guide 35, a signal cable 36, and a fluid tube (not illustrated). The light guide 35, the signal cable 36, and the fluid tube penetrate through the insertion part 20. In addition, an end portion of the universal cord 22 is provided with a connector 37a and a connector 37b. The connector 37a is to be connected to the light source apparatus 11. The connector 37b branches off from the connector 37a and is to be connected to the endoscope processor apparatus 12.

By the connector 37a being connected to the light source apparatus 11, the light guide 35 and the fluid tube (not illustrated) are inserted into the light source apparatus 11. Thus, through the light guide 35 and the fluid tube (not illustrated), necessary illumination light, water, and gas are supplied from the light source apparatus 11 to the endoscope 10. As a result, the site to be observed is irradiated with the illumination light from an illumination window (not illustrated) on the distal end surface of the tip part 27. In accordance with a pressing operation on the above-described air/water supply button 30, the gas or water is injected from an air/water supply nozzle (not illustrated) on the distal end surface of the tip part 27 to the observation window (not illustrated) on the distal end surface.

By the connector 37b being connected to the endoscope processor apparatus 12, the signal cable 36 is electrically connected to the endoscope processor apparatus 12. Thus, through the signal cable 36, an image signal of the site to be observed is output from the imaging element 28 of the endoscope 10 to the endoscope processor apparatus 12, and also, a control signal is output from the endoscope processor apparatus 12 to the endoscope 10.

The light source apparatus 11 supplies the illumination light through the connector 37a to the light guide 35 of the endoscope 10. As the illumination light, light in various wavelength ranges in accordance with an observation purpose, such as white light (light in a white wavelength range or light in a plurality of wavelength ranges), light in one or more specific wavelength ranges, or a combination thereof is selected. The light source apparatus 11 will be described later in detail.

The endoscope processor apparatus 12 controls operations of the endoscope 10 through the connector 37b and the signal cable 36. In addition, based on the image signal acquired from the imaging element 28 of the endoscope 10 through the connector 37b and the signal cable 36, the endoscope processor apparatus 12 generates an image (also referred to as "moving image 38") formed of time-series frame images 38a including the subject image. Furthermore, when the still image capturing instruction unit 32 is operated in the handheld operating unit 21 of the endoscope 10, the endoscope processor apparatus 12 acquires the still image 39 corresponding to the timing of the image capturing instruction of one frame image 38a in the moving image 38 in parallel with the generation of the moving image 38. In this description, the medical image includes the still image 39 and the frame image 38a described above.

In addition, if the moving image 38 and the still image 39 are images obtained using the above-described light in the specific wavelength range (special light), both are special-light images. Then, the endoscope processor apparatus 12 outputs the generated moving image 38 and still image 39 to the display apparatus 13 and the medical image processing apparatus 14.

Note that the endoscope processor apparatus 12 may generate (acquire) the special-light image having information on the above-described specific wavelength range, based on a usual-light image obtained using the above-described white light. In this case, the endoscope processor apparatus 12 functions as a special-light image acquisition unit. Then, the endoscope processor apparatus 12 obtains a signal in the specific wavelength range by performing calculation based on red, green, and blue (RGB) color information or cyan, magenta, and yellow (CMY) color information included in the usual-light image.

Based on, for example, at least one of the usual-light image obtained using the above-described white light or the special-light image obtained using the above-described light in the specific wavelength range (special light), the endoscope processor apparatus 12 may generate a feature amount image such as a known oxygen saturation image. In this case, the endoscope processor apparatus 12 functions as a feature amount image generation unit. Note that the frame images 38a or the still images 39 constituting the moving image 38 including the above-described in-living-body image, the usual-light image, the special-light image, and the feature amount image are all medical images obtained by imaging a human body for the purpose of an image examination or by obtaining images of measurement results.

The display apparatus 13 is connected to the endoscope processor apparatus 12 and functions as the display unit 16 that displays the moving image 38 and the still image 39 input from the endoscope processor apparatus 12. The user operates the insertion part 20 back and forth, for example, while viewing the moving image 38 displayed on the display apparatus 13, and, upon finding a lesion or the like at an imaging target site or the site to be observed, the user operates the still image capturing instruction unit 32 to capture a still image of the site to be observed and give treatment such as diagnosis or biopsy. Note that the moving image 38 and the still image 39 are displayed as well on the display unit 16 connected to the medical image processing apparatus 14, which will be described later.

Note that the endoscope system 9 illustrated in FIG. 1 is a specific example, and an endoscope system of another aspect may also be adopted. For example, processing in a learned model such as a first determiner 42 (FIG. 3) and a second determiner 43 (FIG. 3) described below may be mounted on a dedicated artificial intelligence (AI) box and connected to the endoscope system. In addition, the endoscope system may be connected to a dedicated server via a network, and the medical image may be processed in the dedicated server.

Configuration of Light Source Apparatus

Figure 2:
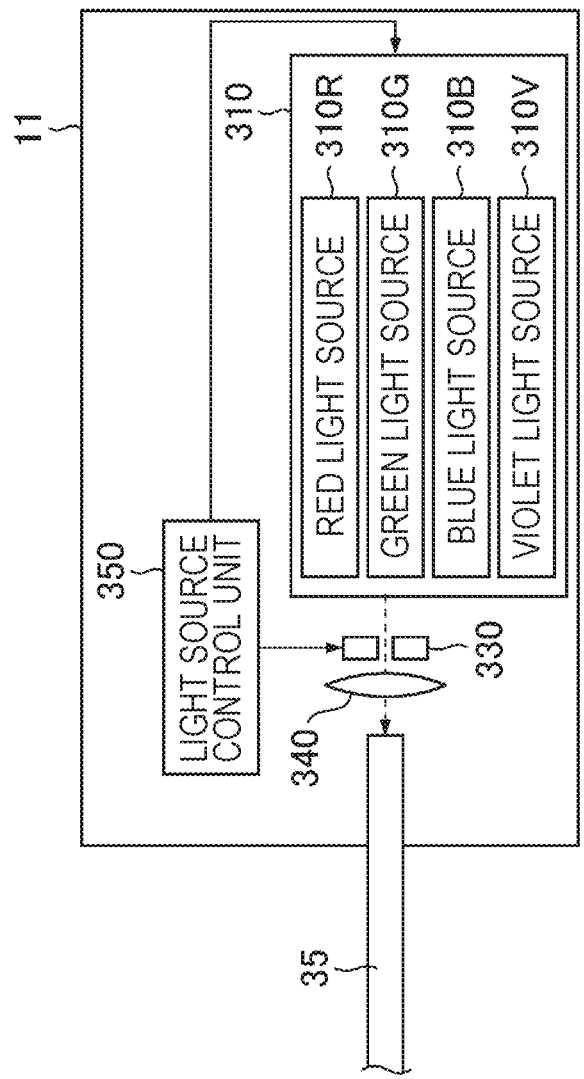
FIG. 2 is a block diagram illustrating a configuration of a light source apparatus.

FIG. 2 is a block diagram illustrating a configuration of the light source apparatus 11.

As illustrated in FIG. 2, the light source apparatus 11 includes a light source 310 for illumination, a diaphragm 330, a condenser lens 340, a light source control unit 350, and the like, and causes observation light to be incident on the light guide 35. The light source 310 includes a red light source 310R, a green light source 310G, a blue light source 310B, and a violet light source 310V that emit red, green, blue, and violet narrow-band light, respectively, and can emit red, green, blue, and violet narrow-band light. The illuminance of the observation light from the light source 310 is controlled by the light source control unit 350, and the illuminance of the observation light can be changed (increased or decreased) and the illumination can be stopped as necessary.

The light source 310 can emit any combination of red, green, blue, and violet narrow-band light. For example, white light (usual light) can be emitted as the observation light by simultaneously emitting red, green, blue, and violet narrow-band light, or narrow-band light (special light) can be emitted by emitting any one or two kinds of the narrow-band light. The light source 310 may further include an infrared light source that emits infrared light (an example of narrow-band light). In addition, the white light and the narrow-band light may be emitted as the observation light by a light source that emits the white light and a filter that transmits the white light and each kind of narrow-band light.

Wavelength Range of Light Source

The light source 310 may be a light source that generates light in a white band or light in a plurality of wavelength ranges as light in a white band, or may be a light source that generates light in a specific wavelength range narrower than the white wavelength range. The specific wavelength range may be a blue range or a green range in the visible region, or a red range in the visible region. If the specific wavelength range is the blue range or the green range in the visible region, the specific wavelength range may include a wavelength range of 390 nm or more and 450 nm or less, or a wavelength range of 530 nm or more and 550 nm or less, and the light in the specific wavelength range may have a peak wavelength in the wavelength range of 390 nm or more and 450 nm or less, or the wavelength range of 530 nm or more and 550 nm or less. If the specific wavelength range is the red range in the visible region, the specific wavelength range may include a wavelength range of 585 nm or more and 615 nm or less, or a wavelength range of 610 nm or more and 730 nm or less, and the light in the specific wavelength range may have a peak wavelength in the wavelength range of 585 nm or more and 615 nm or less, or the wavelength range of 610 nm or more and 730 nm or less.

The specific wavelength range described above may include a wavelength range in which oxygenated hemoglobin and reduced hemoglobin have different absorption coefficients, and the light in the specific wavelength range may have a peak wavelength in the wavelength range in which oxygenated hemoglobin and reduced hemoglobin have different absorption coefficients. In this case, the specific wavelength range may include a wavelength range of 400±10 nm, a wavelength range of 440±10 nm, a wavelength range of 470±10 nm, or a wavelength range of 600 nm or more and 750 nm or less, and the light in the specific wavelength range may have a peak wavelength in the wavelength range of 400±10 nm, the wavelength range of 440±10 nm, the wavelength range of 470±10 nm, or the wavelength range of 600 nm or more and 750 nm or less.

The light generated by the light source 310 may include a wavelength range of 790 nm or more and 820 nm or less, or a wavelength range of 905 nm or more and 970 nm or less, and may have a peak wavelength in the wavelength range of 790 nm or more and 820 nm or less, or the wavelength range of 905 nm or more and 970 nm or less.

In addition, the light source 310 may include a light source that emits exciting light having a peak in 390 nm or more and 470 nm or less. In this case, it is possible to acquire an endoscopic image having information of fluorescence emitted by a fluorescent substance in the subject (living body). If a fluorescence image is to be acquired, a fluorescent dye (such as fluorescein or acridine orange) may be used.

The type of the light source 310 (a laser light source, a xenon light source, a light-emitting diode (LED) light source, or the like), the wavelength, the presence or absence of a filter, and the like are preferably set in accordance with the type, site, observation purpose, and the like of the subject. In addition, at the time of observation, the wavelength of the observation light is preferably combined and/or switched in accordance with the type, site, observation purpose, and the like of the subject. In a case of switching the wavelength, for example, the wavelength of the light to be emitted may be switched by rotating a disc-shaped filter (rotary color filter) disposed in front of the light source and is provided with a filter that transmits or blocks light having a specific wavelength.

In addition, the imaging element 28 used in implementing the present invention is not limited to a color imaging element in which a color filter is provided for each pixel, and may be a monochrome imaging element. If the monochrome imaging element is used, it is possible to perform imaging in a frame sequential manner (color sequential manner) by sequentially switching the wavelength of the observation light. For example, the wavelength of the observation light to be emitted may be sequentially switched among (violet, blue, green, and red), or wide-band light (white light) may be emitted and the wavelength of the observation light to be emitted may be switched by using a rotary color filter (red, green, blue, violet, or the like). In addition, one or a plurality of kinds of narrow-band light (green, blue, violet, or the like) may be emitted, and the wavelength of the observation light to be emitted may be switched by using a rotary color filter (green, blue, violet, or the like). The narrow-band light may be infrared light having two or more different wavelengths (first narrow-band light and second narrow-band light).

Medical Image Processing Apparatus

Figure 3:
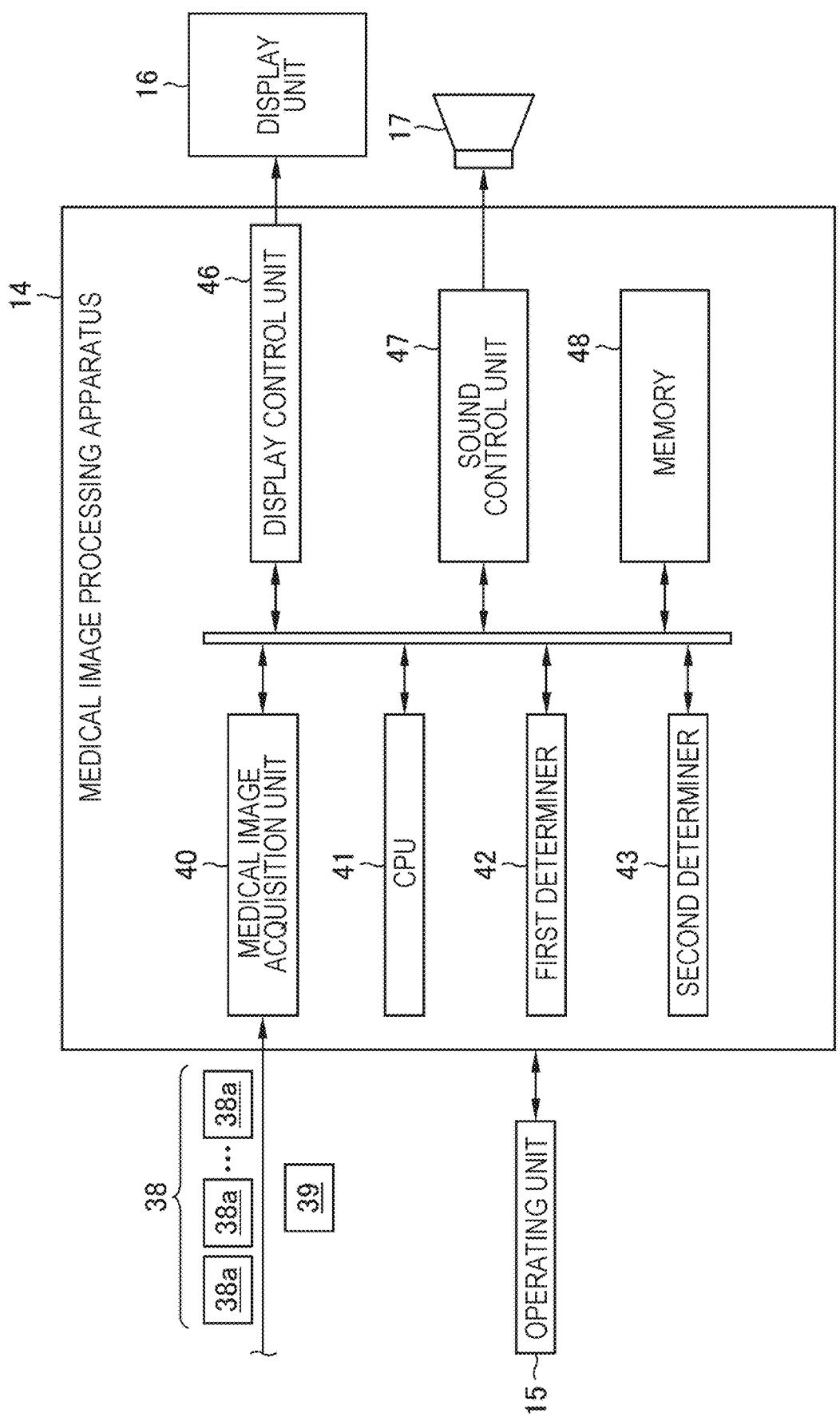
FIG. 3 is a block diagram illustrating an embodiment of a medical image processing apparatus.

FIG. 3 is a block diagram illustrating an embodiment of the medical image processing apparatus 14. The medical image processing apparatus 14 acquires a medical image and performs a first determination process and a second determination process, based on the acquired medical image. Subsequently, the medical image processing apparatus 14 performs a display control process of displaying a notification indicator on the display unit 16, based on determination results of the second determination process.

The medical image processing apparatus 14 is constituted by, for example, a computer. The operating unit 15 includes buttons provided in the handheld operating unit 21 of the endoscope 10 in addition to a keyboard, a mouse, and the like connected to a computer in a wired or wireless manner, and various monitors such as a liquid crystal monitor connectable to the computer are used as the display unit 16.

The medical image processing apparatus 14 includes a medical image acquisition unit 40, a central processing unit (CPU) 41, the first determiner 42, the second determiner 43, a display control unit 46, a sound control unit 47, and a memory 48. Processing in each unit is implemented by one or more processors. Herein, the processor may be constituted by the CPU 41 or may be constituted by one or more CPUs that are not illustrated.

The CPU 41 operates based on various programs including an operation system and a medical image processing program according to the present invention, which are stored in the memory 48, integrally controls the medical image acquisition unit 40, the first determiner 42, the second determiner 43, the display control unit 46, and the sound control unit 47, and functions as a part of these units.

The medical image acquisition unit 40 acquires a medical image. The medical image acquisition unit 40 acquires a medical image including a subject image from the endoscope processor apparatus 12 (FIG. 1) using an image input/output interface (not illustrated) connected to the endoscope processor apparatus 12 in a wired or wireless manner. For example, if the above-described still image 39 is captured while the moving image 38 is being captured with the endoscope 10, the medical image acquisition unit 40 acquires the still image 39 from the endoscope processor apparatus 12. The medical image acquisition unit 40 may further acquire the frame image 38a constituting the moving image 38 as the medical image.

Based on the medical image acquired by the medical image acquisition unit 40, the first determiner 42 performs the first determination process of determining whether any of a plurality of preset imaging target sites is included in the medical image. Here, the imaging target site is a site that is to be intentionally imaged and recorded in an examination. The imaging target site is also a site that needs to be imaged by intentionally operating the endoscope 10. The imaging target site is a site that is relatively difficult to image and is a site for which it is difficult for the user to determine whether imaging is performed appropriately.

A plurality of imaging target sites are set in accordance with the purpose of the examination or the like. For example, 5 or more and 15 or less, preferably 5 or more and 10 or less, imaging target sites are set. For example, when examining the inside of the stomach with the endoscope system 9, the imaging target sites are set as the "esophagogastric junction", the "lesser curvature J-turn immediately below the cardia (imaging by a J-turn operation)", the "greater curvature U-turn immediately below the cardia (imaging by a U-turn operation)", the "lesser curvature posterior wall J-turn from the angulus or lower body part", the "pyloric ring from the prepyloric region", and the "greater curvature in the lower body part from above". Note that the "lesser curvature posterior wall J-turn from the angulus or lower body part" may be set as the "lesser curvature J-turn in the lower body part" in consideration of the fact that it is sometimes not possible to image the angulus and the fact that it is not possible to reliably image the posterior wall. In addition, the "pyloric ring from the prepyloric region" may be the "entire view of the antrum" in which importance is attached to whether the antrum is imaged in a bird's eye view rather than imaging the pyloric ring in a pinpoint manner. In addition, the "greater curvature in the lower body part from above" is not limited to the lower body part, and may be the "greater curvature from above" in which importance is attached to the fact that the greater curvature with the folds open is imaged. In addition, for example, in a case where the inside of the large intestine is examined with the endoscope system 9, the imaging target sites are set as the "rectum", the "anus", the "splenic flexure", the "hepatic flexure", the "duodenal entrance", and "ileocecal region".

The first determiner 42 recognizes the imaging target site included in the input medical image, by various methods. For example, the first determiner 42 recognizes the imaging target site included in the input medical image, using a learned model (recognition model) constituted by a convolutional neural network (CNN) or the like. The first determiner 42 learns an image (medical image) to recognize the preset imaging target site, generates a learned model, and determines, using the learned model, whether the imaging target site set in the medical image is included.

The first determiner 42 may perform recognition by determining the input medical image, based on classification or similarity. If the first determiner 42 recognizes the imaging target site by classifying the medical image, a technique described in a document (B. Zhou, A. Lapedriza, J. Xiao, A. Torralba, and A. Oliva. Learning deep features for scene recognition using places database. In Neural Information Processing Systems (NIPS), pages 487 to 495, 2014. 1, 4, 6, 8) can be used. If the first determiner 42 recognizes the imaging target site, based on the similarity of the feature amount of the medical image, a technique described in a document (FaceNet: A Unified Embedding for Face Recognition and Clustering https://arxiv.org/ab s/15030.03832) can be used.

If the first determiner 42 determines that any of the plurality of imaging target sites is included in the medical image, the second determiner 43 determines whether the medical image is an image satisfying a determination criterion of a site included in the medical image. That is, the second determiner 43 determines whether the imaging target site is appropriately imaged in the medical image as a desired medical image. The medical image obtained by imaging the imaging target site as desired is a good image and an image suitable for diagnosis.

The second determiner 43 is provided for each imaging target site and can perform determination based on a different determination criterion. In addition, the determination by the second determiner 43 is performed based on a plurality of indices and based on determination results of the plurality of indices. Note that the first determiner 42 and the second determiner 43 will be described later in detail.

If it is determined in the second determination process that the medical image is the image satisfying the determination criterion of the site included in the medical image, the display control unit 46 displays a notification indicator on the display unit 16. the notification indicator indicating that the image satisfying the determination criterion of the site included in the medical image is captured. Note that display under the control of the display control unit 46 may be on the display apparatus 13 instead of the display unit 16.

The sound control unit 47 reproduces a notification sound from a speaker 17. For example, the notification sound is reproduced from the speaker 17 in accordance with the display of the notification indicator under the control of the display control unit 46.

The memory 48 includes a flash memory, a read-only memory (ROM), a random access memory (RAM), a hard disk apparatus, and the like. The flash memory, the ROM, and the hard disk apparatus are non-volatile memories that store an operation system, various programs such as the medical image processing program according to the present invention, the captured still image 39, the captured moving image 38, and the like. In addition, the RAM is a volatile memory from which data can be read and on which data can be written at high speed and that functions as an area for temporarily storing various programs stored in the non-volatile memory and as a work area for the CPU 41.

Medical Image Processing Method

Next, a medical image processing method using the medical image processing apparatus 14 will be described. For example, the medical image processing method is performed by a processor of the medical image apparatus 14 executing a program.

Figure 4:
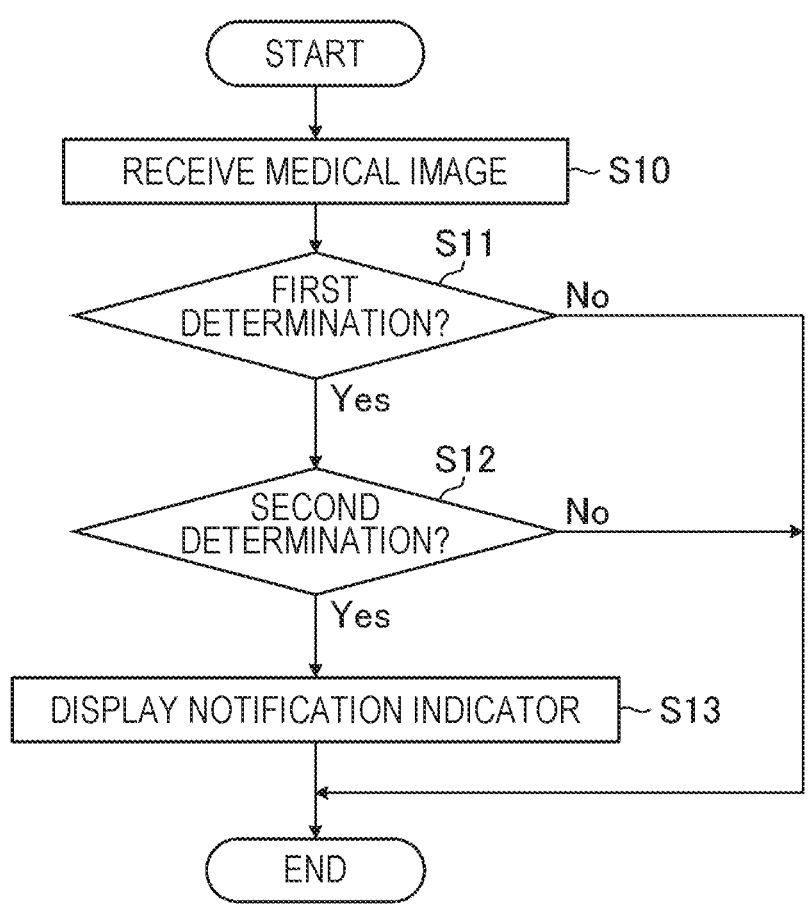
FIG. 4 is a flowchart illustrating a medical image processing method.

FIG. 4 is a flowchart illustrating the medical image processing method using the medical image processing apparatus 14.

First, the medical image acquisition unit 40 acquires a medical image (for example, the still image 39) from the endoscope processor apparatus 12 (step S10). Subsequently, the first determiner 42 performs the first determination process based on the acquired medical image (step S11: first determination step). Specifically, the first determiner 42 determines whether any of the plurality of imaging target sites is included in the medical image. If the first determiner 42 determines that the medical image does not include any imaging target sites (No in step S11), the second determiner 43 in the subsequent stage does not perform the second determination process.

On the other hand, if the first determiner 42 determines that the medical image includes any imaging target site (Yes in step S11), the second determiner 43 performs the second determination process, based on the medical image on which the first determination process is performed (step S12: second determination step). Specifically, the second determiner 43 determines whether the determination criterion set for the site determined by the first determiner 42 is satisfied based on the set indices. If the second determiner 43 determines that the determination criterion is not satisfied (No in step S12), the notification indicator is not displayed on the display unit 16.

On the other hand, if the second determiner 43 determines that the medical image satisfies the determination criterion, the display control unit 46 displays the notification indicator on the display unit 16 (step S13: display control step). Note that the still image 39 is acquired based on an instruction from the still image capturing instruction unit 32, and the above-described processes are sequentially performed on the acquired still image 39.

The first determination process, the second determination process, and the display control process will be described below in detail.

First Determination Process and Second Determination Process

First, the first determination process performed in the first determination step and the second determination process performed in the second determination step will be described.

Figure 5:
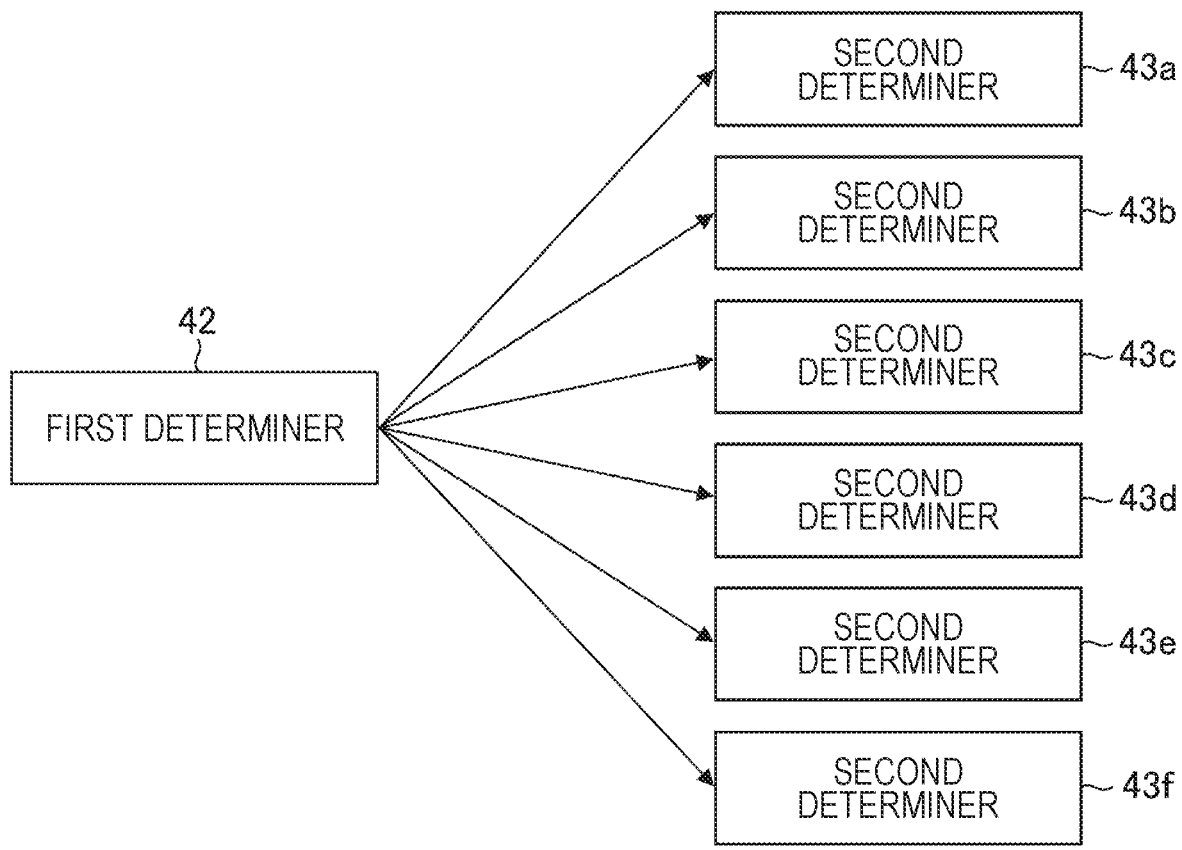
FIG. 5 is a diagram illustrating a specific configuration example of a first determiner and second determiners.

FIG. 5 is a diagram illustrating a specific configuration example of the first determiner 42 that performs the first determination process and the second determiner 43 that performs the second determination process.

The first determiner 42 is a learned model constituted by a CNN, and machine learning is performed in advance. Six sites inside the stomach (see FIGS. 7 and 8) are set as the imaging target sites. The first determiner 42 determines whether the six sites inside the stomach are included in the medical image. Specifically, the first determiner 42 determines whether the imaging target sites of the "esophagogastric junction", the "lesser curvature J-turn immediately below the cardia (imaging by a J-turn operation)", the "greater curvature U-turn immediately below the cardia (imaging by a U-turn operation)", the "lesser curvature posterior wall J-turn from the angulus or lower body part", the "pyloric ring from the prepyloric region", and the "greater curvature in the lower body part from above" are included in the medical image. Note that the first determiner 42 performs learning using learning data constituted by medical images obtained by imaging the six sites inside the stomach so as to recognize each of the above-described imaging target sites.

For example, the first determiner 42 recognizes the imaging target site in the medical image, based on a classification score for each of the above-described six imaging target sites. The first determiner 42 recognizes the imaging target site having the highest classification score among the classification scores output for the respective imaging target sites. Note that a threshold value is set in the first determiner 42, and if the classification score is less than the threshold value, it is determined that the medical image includes no imaging target sites.

If the first determiner 42 recognizes that the medical image includes an imaging target site, second determiners 43a to 43f corresponding to the recognized imaging target site performs the second determination process. For example, if the first determiner 42 determines that the "esophagogastric junction" is included in the input medical image, the second determiner 43a performs the second determination process. Similarly, if the first determiner 42 determines that the "lesser curvature J-turn immediately below the cardia (imaging by a J-turn operation)" is included in the medical image, the second determiner 43b performs the second determination process; if the first determiner 42 determines that the "greater curvature U-turn immediately below the cardia (imaging by a U-turn operation)" is included in the medical image, the second determiner 43c performs the second determination process; if the first determiner 42 determines that the "lesser curvature posterior wall J-turn from the angulus or lower body part" is included in the medical image, the second determiner 43d performs the second determination process; if the first determiner 42 determines that the "pyloric ring from the prepyloric region" is included in the medical image, the second determiner 43e performs the second determination process; and if the first determiner 42 determines that the "greater curvature in the lower body part from above" is included in the medical image, the second determiner 43f performs the second determination process. In this manner, the second determiners 43a to 43f are provided for the respective imaging target sites determined by the first determiner 42. Each of the second determiners 43a to 43f can perform the determination based on a different determination criterion based on a plurality of indices.

Figure 6:
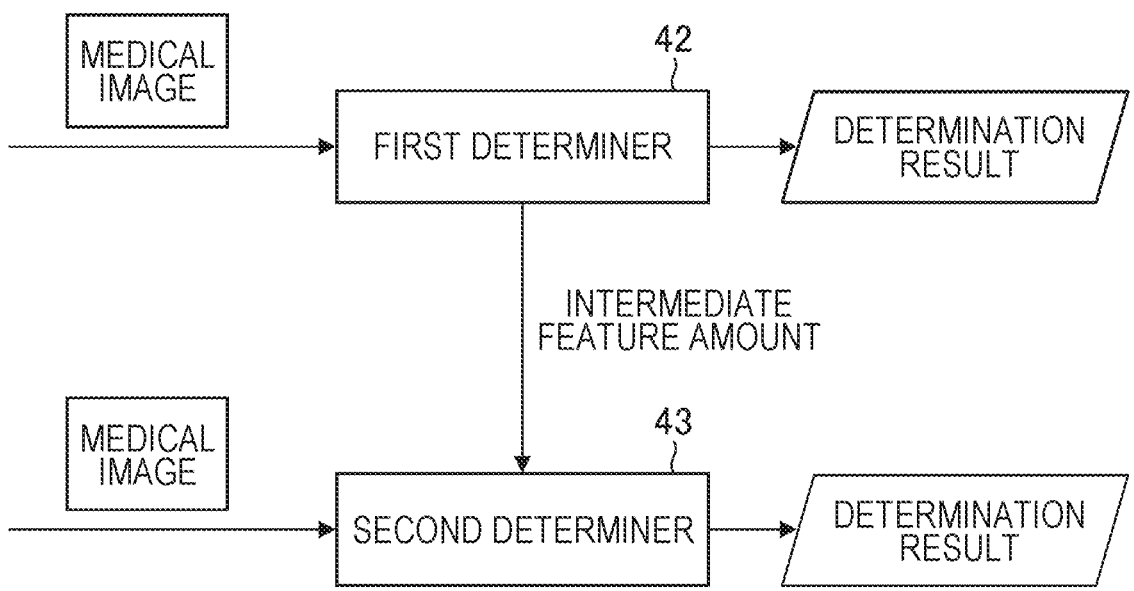
FIG. 6 is a diagram illustrating data input to the first determiner and the second determiners.

FIG. 6 is a diagram illustrating data input to the first determiner 42 and the second determiner 43.

The medical image (still image 39) acquired by the medical image acquisition unit 40 is input to the first determiner 42. The first determiner 42 performs calculation in each layer constituting the CNN, based on the input medical image, and generates an intermediate feature amount of the input medical image. Subsequently, the first determiner 42 outputs a determination result based on the intermediate feature amount.

Similarly to the first determiner 42, the medical image acquired by the medical image acquisition unit 40 is input to the second determiner 43. In addition, the intermediate feature amount generated by the first determiner 42 is input to the second determiner 43. The second determiner 43 outputs a determination result based on the medical image and the intermediate feature amount. In this manner, the first determiner 42 outputs the determination result based on the medical image, and the second determiner 43 outputs the determination result based on the medical image and the intermediate feature amount.

Figure 7:
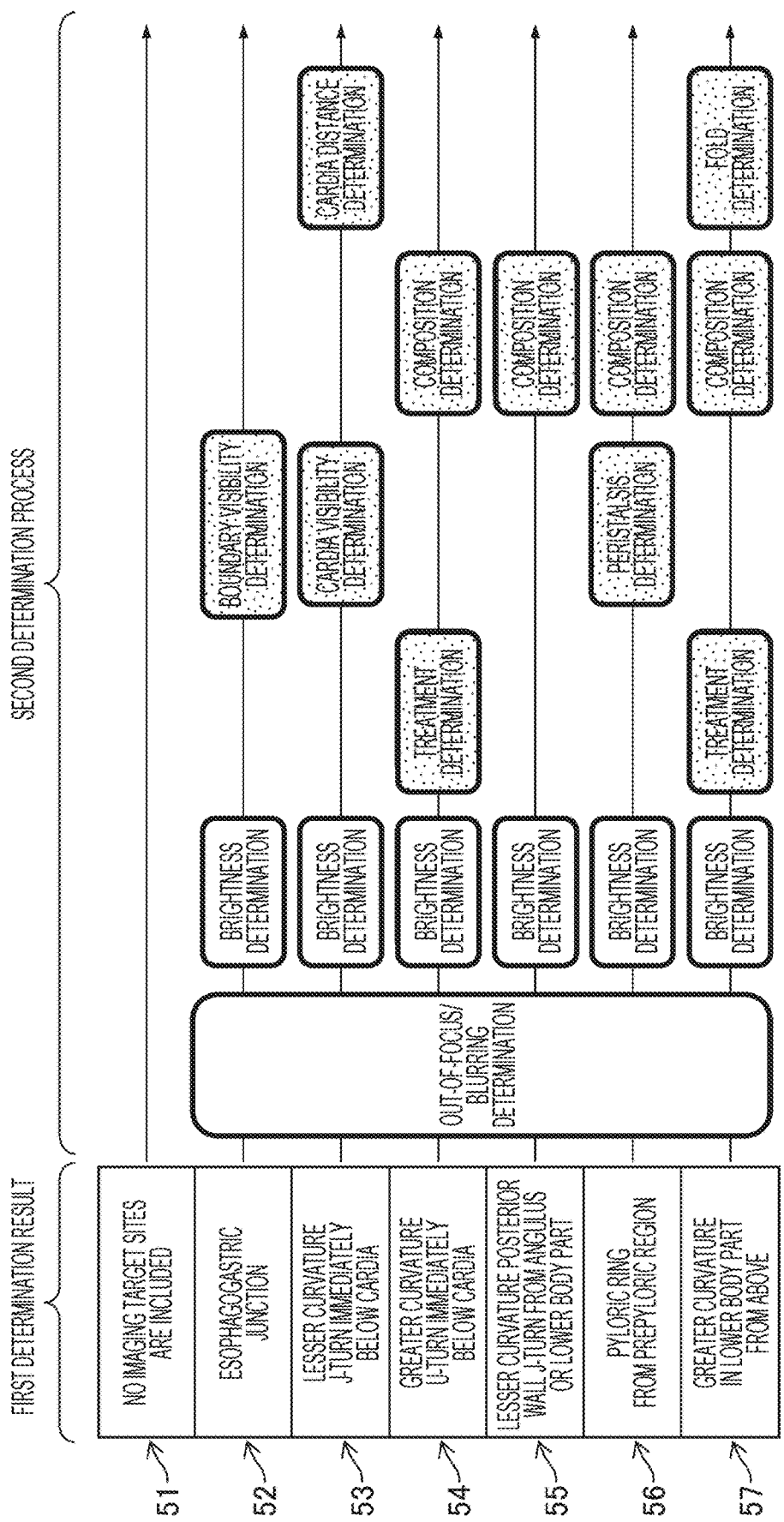
FIG. 7 is a diagram illustrating specific examples of respective indices of the second determiners.

FIG. 7 is a diagram illustrating specific examples of the indices of the second determiners 43a to 43f.

Each of the second determiners 43a to 43f outputs determination results based on the plurality of indices. The indices of the second determiner 43a are denoted by reference numeral 52, the indices of the second determiner 43b are denoted by reference numeral 53, the indices of the second determiner 43c are denoted by reference numeral 54, the indices of the second determiner 43d are denoted by reference numeral 55, the indices of the second determiner 43e are denoted by reference numeral 56, and the indices of the second determiner 43f are denoted by reference numeral 57. Note that reference numeral 51 indicates that the second determination process is not performed in a case where the first determiner 42 determines that no imaging target sites are included in the medical image.

Reference numeral 52 indicates the second determination process performed if the first determiner 42 determines that the "esophagogastric junction" is included in the medical image. In this case, the second determiner 43a performs the second determination process based on the indices of out-of-focus/blurring determination, brightness determination, and boundary visibility determination. Here, the out-of-focus/blurring determination determines whether the medical image is out of focus and/or blurred based on the input medical image. The out-of-focus/blurring determination is performed by an out-of-focus/blurring determiner, and the out-of-focus/blurring determination of the medical image is performed by a known technique such as fast Fourier transform (FFT). The brightness determination is performed based on the input medical image, for example, based on the luminance of the medical image. The boundary visibility determination is performed by a boundary visibility determiner of a learned model constituted by a CNN. The boundary visibility determiner determines whether the junction between the stomach and the esophagus is visible in the medical image, based on the input intermediate feature amount. The second determiner 43a determines whether the determination results based on the respective indices of the out-of-focus/blurring determination, the brightness determination, and the boundary visibility determination of the medical image satisfy a predetermined determination criterion. Here, as the determination criterion, a threshold value of a value obtained by adding, averaging, or weighted-averaging the determination results based on the indices is set.

Reference numeral 53 indicates the second determination process performed if the first determiner 42 determines that the "lesser curvature J-turn immediately below the cardia (imaging by a J-turn operation)" is included in the medical image. In this case, the second determiner 43b performs the second determination process based on the indices of the out-of-focus/blurring determination, the brightness determination, cardia visibility determination, and cardia distance determination. The cardia visibility determination and the cardia distance determination are performed by a cardia visibility determiner and a cardia distance determiner of a learned model constituted by a CNN. The cardia visibility determiner determines whether the cardia is visible in the medical image based on the input intermediate feature amount. The cardia distance determiner determines the distance from the distal end of the endoscope 10 (the imaging surface of the imaging element 28) to the cardia in the medical image, based on the input intermediate feature amount.

Reference numeral 54 indicates the second determination process performed if the first determiner 42 determines that the "greater curvature U-turn immediately below the cardia" is included in the medical image. In this case, the second determiner 43c performs the second determination process based on the indices of the out-of-focus/blurring determination, the brightness determination, treatment determination, and composition determination. The treatment determination and the composition determination are performed by a treatment determiner and a composition determiner of a learned model constituted by a CNN. The treatment determiner determines whether water, residue, or foam is accumulated in the site included in the medical image, based on the input intermediate feature amount. The composition determiner determines the composition of the medical image, based on the input intermediate feature amount. For example, the composition determiner determines the composition of the medical image, for example, whether the imaging target site is captured at the center.

Reference numeral 55 indicates the second determination process performed if the first determiner 42 determines that the "lesser curvature posterior wall J-turn from the angulus or lower body part" is included in the medical image. In this case, the second determiner 43d performs the second determination process based on the indices of the out-of-focus/blurring determination, the brightness determination, and the composition determination.

Reference numeral 56 indicates the second determination process performed if the first determiner 42 determines that the "pyloric ring from the prepyloric region" is included in the medical image. In this case, the second determiner 43e performs the second determination process based on the indices of the out-of-focus/blurring determination, the brightness determination, peristalsis determination, and the composition determination. Here, the peristalsis determination is performed by a peristalsis determiner of a learned model constituted by a CNN. The peristalsis determiner determines whether peristalsis is present in the imaging target site in the medical image, based on the input intermediate feature amount.

Reference numeral 57 indicates the second determination process performed if the first determiner 42 determines that the "greater curvature in the lower body part from above" is included in the medical image. In this case, the second determiner 43f performs the second determination process based on the indices of the out-of-focus/blurring determination, the brightness determination, the treatment determination, the composition determination, and fold determination. Here, the fold determination is performed by a fold determiner of a learned model constituted by a CNN. The fold determiner determines whether a fold in the imaging target site extends in the medical image, based on the input intermediate feature amount.

The out-of-focus/blurring determination is performed by the second determiners 43a to 43f based on a common criterion, and the determination of other indices is performed individually and independently by the second determiners 43a to 43f In addition, in the above description, the example in which the intermediate feature amount is acquired from the first determiner 42 has been described, but the present invention is not limited thereto. For example, the second determiners 43a to 43f may perform determination by individually calculating the feature amount.

As described above, in the second determination process, the determination using the learned model (the boundary visibility determination, the cardia visibility determination, the cardia distance determination, the treatment determination, the composition determination, the peristalsis determination, and the fold determination) and the determination using a pixel value without using the learned model (the out-of-focus/blurring determination and the brightness determination) are combined. The determination accuracy and the determination speed can be optimized by selectively using the determination using the learned model and the determination using the pixel value without using the learned model in accordance with the indices constituting the second determination process. In addition, in the second determination process, the determination accuracy can be increased using a plurality of learned models for the determination.

As described above, in the first determination process, it is determined whether any of the imaging target sites is included in the medical image. In addition, in the second determination process, based on the result of the first determination process, it is determined whether a desired medical image is captured based on each determination criterion based on the indices different for each imaging target site.

Note that the above description of the first determination process and the second determination process is a specific example, and the present invention is not limited thereto. The first determination process and the second determination process may adopt the following aspects.

In the above-described example, an example has been described in which the second determination process is performed for all the imaging target sites determined to be included in the medical image in the first determination process, but the present invention is not limited to this example. For example, the second determination process may be performed for some of the imaging target sites determined to be included in the medical image in the first determination process. Specifically, the first determination process determines whether any of 13 imaging target sites is included in the medical image, and the second determination process is performed if it is determined that predetermined six imaging target sites are included in the medical image. In this manner, for example, the second determination process is set to be performed for a site where a medical image suitable for diagnosis needs to be acquired, so that a desired medical image can be efficiently acquired.

In the above-described example, the case where the criterion of the brightness determination is different for each imaging target site has been described. However, the criterion of the brightness determination may be common to all the imaging target sites. By setting the criterion of the brightness determination for each imaging target site, for example, it is possible to determine whether the brightness is suitable for diagnosis for each imaging target site.

Display Control Process

Next, the display control process performed in the display control step will be described.

Figure 8:
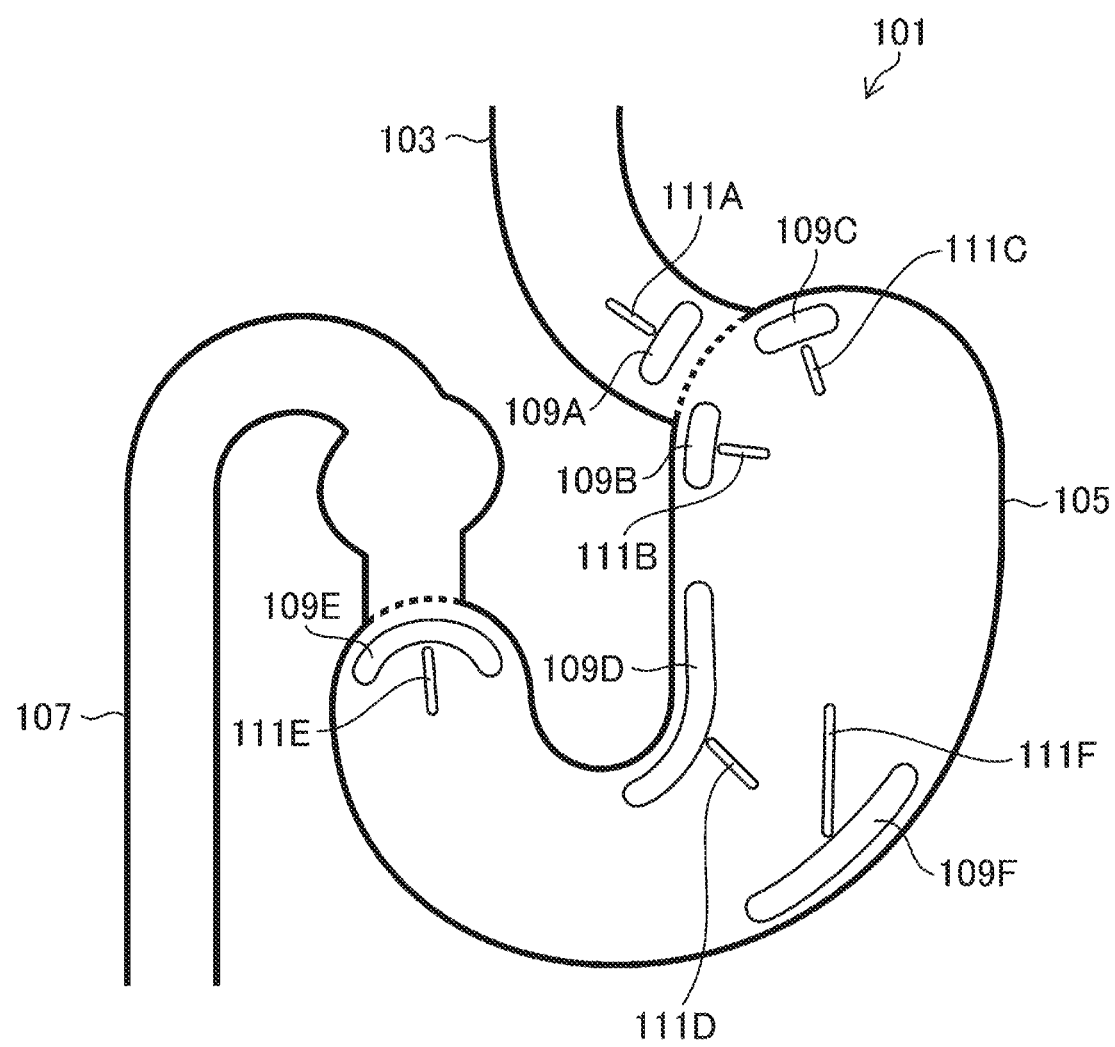
FIG. 8 is a diagram illustrating a schematic diagram displayed on a display unit.

FIG. 8 is a diagram illustrating a schematic diagram displayed on the display unit 16 under control of the display control unit 46.

A schematic diagram 101 is a model image of a luminal organ captured with the endoscope 10. The schematic diagram 101 includes a stomach 105, an esophagus 103, and a duodenum 107, and each of the esophagus 103 and the duodenum 107 is connected to the stomach 105. On the schematic diagram 101, site indicators 109A to 109F indicating modeled imaging target sites are displayed at corresponding positions. Here, the site indicator 109A schematically illustrates the "esophagogastric junction", the site indicator 109B schematically illustrates the "lesser curvature J-turn immediately below the cardia", the site indicator 109C schematically illustrates the "greater curvature U-turn immediately below the cardia", the site indicator 109D schematically illustrates the "lesser curvature posterior wall J-turn from the angulus or lower body part", the site indicator 109E schematically illustrates the "pyloric ring from the prepyloric region", and the site indicator 109F schematically illustrates the "greater curvature in the lower body part from above".

In addition, guide indicators for guiding imaging with the endoscope 10 are indicated for the site indicators 109A to 109F. Specifically, a guide indicator 111A is indicated for the site indicator 109A, a guide indicator 111B is indicated for the site indicator 109B, a guide indicator 111C is indicated for the site indicator 109C, a guide indicator 111D is indicated for the site indicator 109D, a guide indicator 111E is indicated for the site indicator 109E, and a guide indicator 111F is indicated for the site indicator 109F. Each of the guide indicators 111A to 111F has a stick shape, and the imaging direction of the endoscope 10 is indicated by the direction of the stick shape. In addition, the distance from the imaging target site of the endoscope 10 is indicated by the length of the stick shape. Specifically, the distal end on the opposite side of each of the stick-shaped site indicators 109A to 109F of the guide indicators 111A to 111F indicates an imaging position (the position of the tip part 27 of the endoscope) at which an image satisfying the determination criterion in the second determination process is likely to be obtained. If imaging is performed by positioning the tip part 27 of the endoscope 10 at the distal end on the opposite side of the stick-shaped site indicators 109A to 109F, a desired medical image (for example, having a composition suitable for diagnosis) can be acquired. In this manner, by indicating a position at which a medical image satisfying the determination criterion in the composition determination of the second determination process can be captured, it is possible to assist acquisition of a medical image suitable for diagnosis.

In imaging of the imaging target site with the endoscope system 9, the display control unit 46 displays the schematic diagram 101 on the display unit 16.

Figure 9:
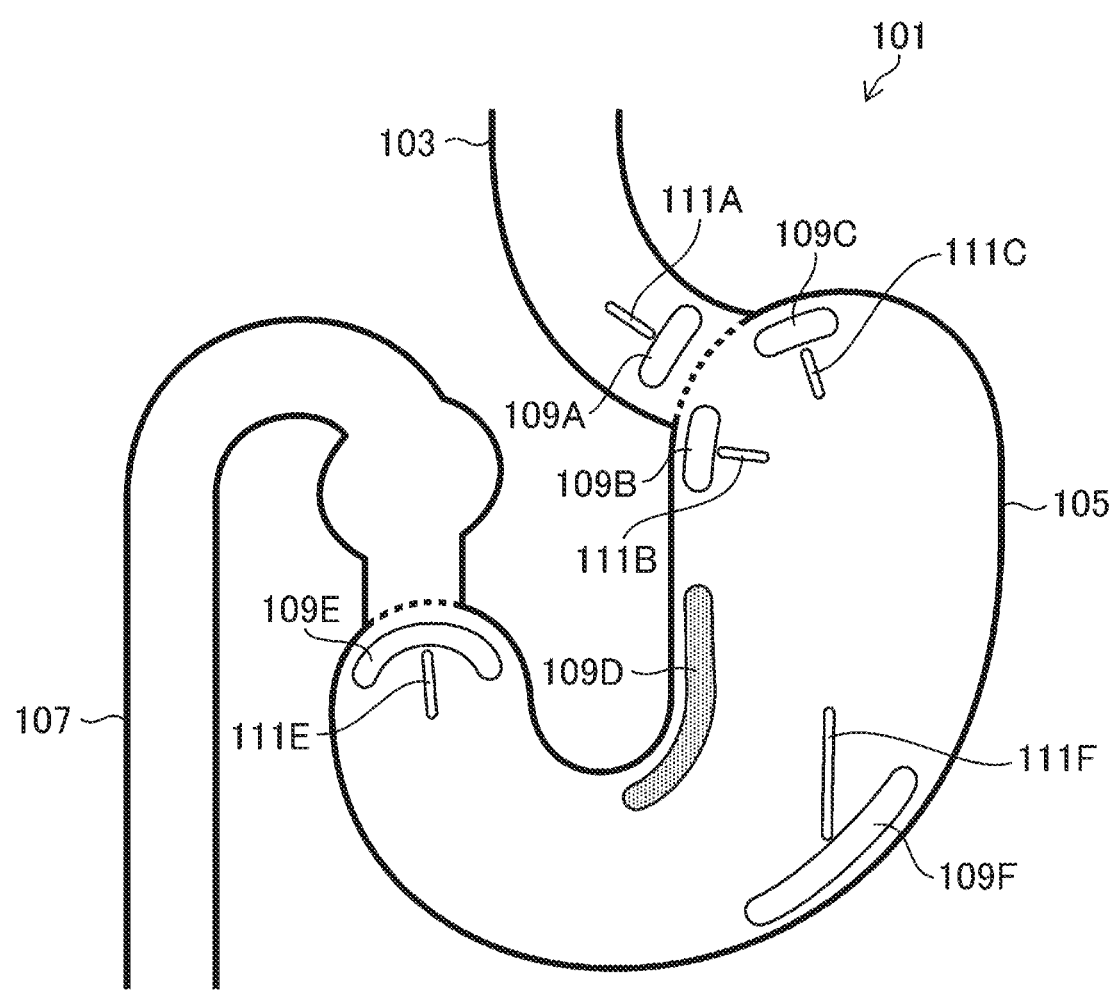
FIG. 9 is a diagram illustrating a notification indicator on the schematic diagram.

FIG. 9 is a diagram illustrating a notification indicator on the schematic diagram.

If it is determined in the second determination process that the image satisfies the determination criterion, the display control unit 46 displays a notification indicator indicating that the image satisfies the determination criterion on the display unit 16. The display control unit 46 displays the notification indicator by changing the display form of any of the site indicators 109A to 109F on the schematic diagram 101. The notification indicator is displayed by changing the display form of the site indicator corresponding to the site satisfying the determination criterion in the second determination process among the site indicators 109A to 109F. In the illustrated case, the notification indicator is displayed by changing the color of any of the site indicators 109A to 109F. In addition, since acquisition of the desired medical image is completed, the display control unit 46 hides the guide indicator corresponding to any of the site indicators 109A to 109F for which the notification indicator is displayed. Note that the display of the guide indicator corresponding to any of the site indicators 109A to 109F for which the notification indicator is displayed may be maintained. In addition, the notification indicator can adopt various aspects. For example, as the notification indicator, the site indicator may be blinked or lit. In addition to the notification indicator, a notification sound may be output from the speaker 17 by the sound control unit 47.

As described above, in the present embodiment, it is determined in the first determination process whether any of a plurality of imaging target sites is included in the medical image, it is determined in the second determination process whether the determination criterion of the site included in the medical image is satisfied, and the notification indicator is displayed on the display unit 16 if the medical image satisfies the determination criterion. Accordingly, the user can efficiently acquire a desired medical image satisfying the determination criterion in the imaging target site.

First Modification

Next, a first modification of the present embodiment will be described. In this example, upon imaging of all the imaging target sites, information indicating that imaging of all the imaging target sites is completed (complete information) is displayed on the display unit 16. By the complete information being displayed on the display unit 16, the user can easily recognize that imaging of the imaging target sites is completed.

Figure 10:
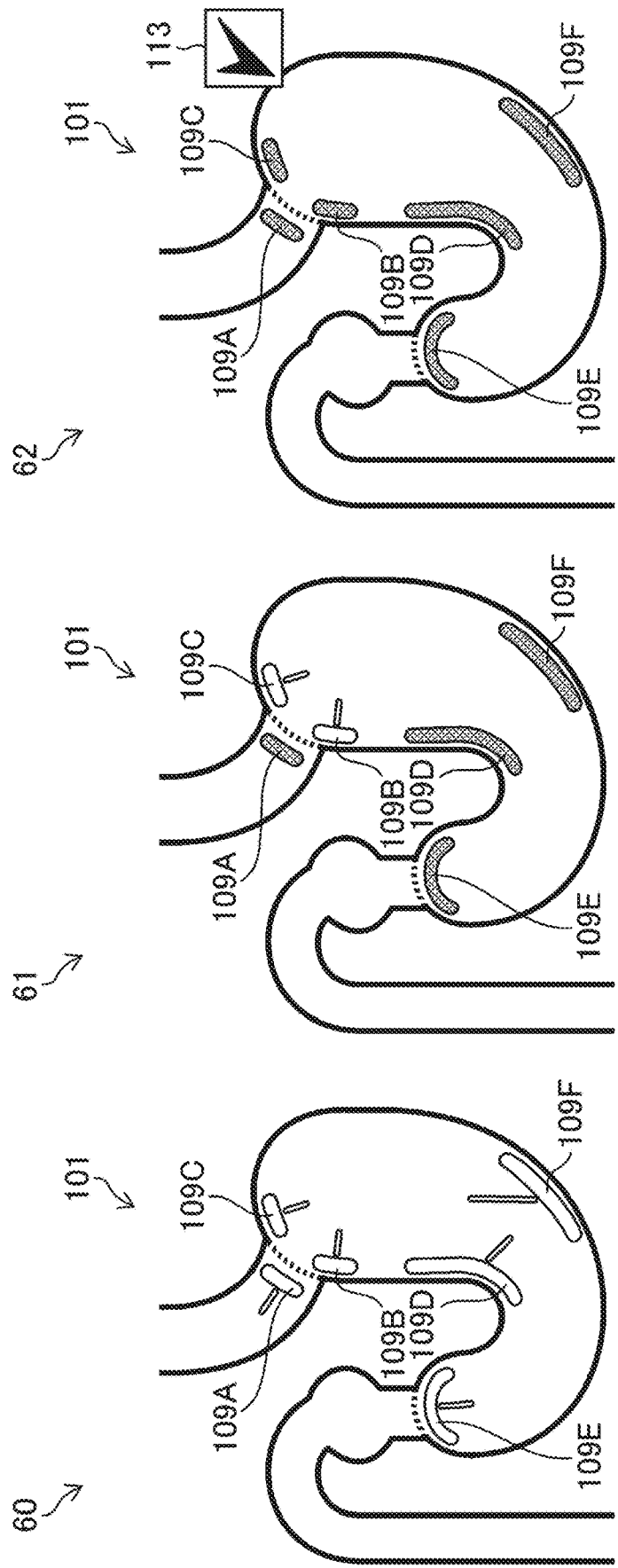
FIG. 10 is a diagram illustrating complete information displayed on the display unit.

FIG. 10 is a diagram illustrating the complete information displayed on the display unit 16.

Reference numeral 60 denotes a display example on the display unit 16 at a start stage of an endoscopic examination of the stomach 105. The schematic diagram 101 is displayed on the display unit 16, and the schematic diagram 101 has the site indicators 109A to 109F of the imaging target sites. In the case indicated by reference numeral 60, there is no imaging target site for which imaging is completed, and thus, all the site indicators 109A to 109F are displayed indicating that imaging is yet to be performed.

Reference numeral 61 denotes a display example of a state in which the "esophagogastric junction", the "lesser curvature posterior wall J-turn from the angulus or lower body part", and the "pyloric ring from the prepyloric region" in a middle stage of the endoscopic examination of the stomach 105 satisfy the determination criterion in the second determination process. On the schematic diagram 101 displayed on the display unit 16, the display form of the site indicator 109A, the site indicator 109D, the site indicator 109E, and the site indicator 109F is changed to display the notification indicator. Note that the display control unit 46 maintains the display of the notification indicator until the notification indicator for all the plurality of imaging target sites is displayed. Accordingly, the user can accurately grasp the progress of imaging of the imaging target sites. Note that the schematic diagram 101 may be displayed or not displayed on the display unit 16 in response to detection of an event such as still image acquisition or lesion detection. If the schematic diagram 101 is to be displayed during the examination, the schematic diagram 101 may be started to be displayed in a state in which the notification indicator is displayed for the site or sites satisfying the determination criterion in the second determination process from the start of the examination to the time point when the schematic diagram 101 is displayed.

Reference numeral 62 denotes a display example on the display unit 16 at a stage where imaging of all the imaging target sites is completed. If it is determined in the second determination process that the medical image is the image satisfying the determination criterion for all the imaging target sites, complete information 113 indicating that imaging of all the imaging target sites is completed is displayed on the display unit 16. Here, the complete information 113 can adopt various display forms. In the illustrated case, the complete information 113 is indicated by a check box. Note that it is possible to adopt a display mode of reducing the brightness of the notification indicator for the site indicators 109A to 109F in accordance with the lighting of the complete information 113. In addition, after a predetermined time elapses from when the complete information 113 is displayed, the site indicators 109A to 109F may be canceled, and only the complete information 113 may be displayed.

As described above, in this example, if imaging of all the imaging target sites is completed, the complete information 113 is displayed on the display unit 16. Accordingly, the user can easily recognize that imaging of all the imaging target sites is completed.

Second Modification

Next, a second modification of the present embodiment will be described. In this example, the site indicator for the imaging target site for which imaging is newly completed is highlighted.

Figure 11:
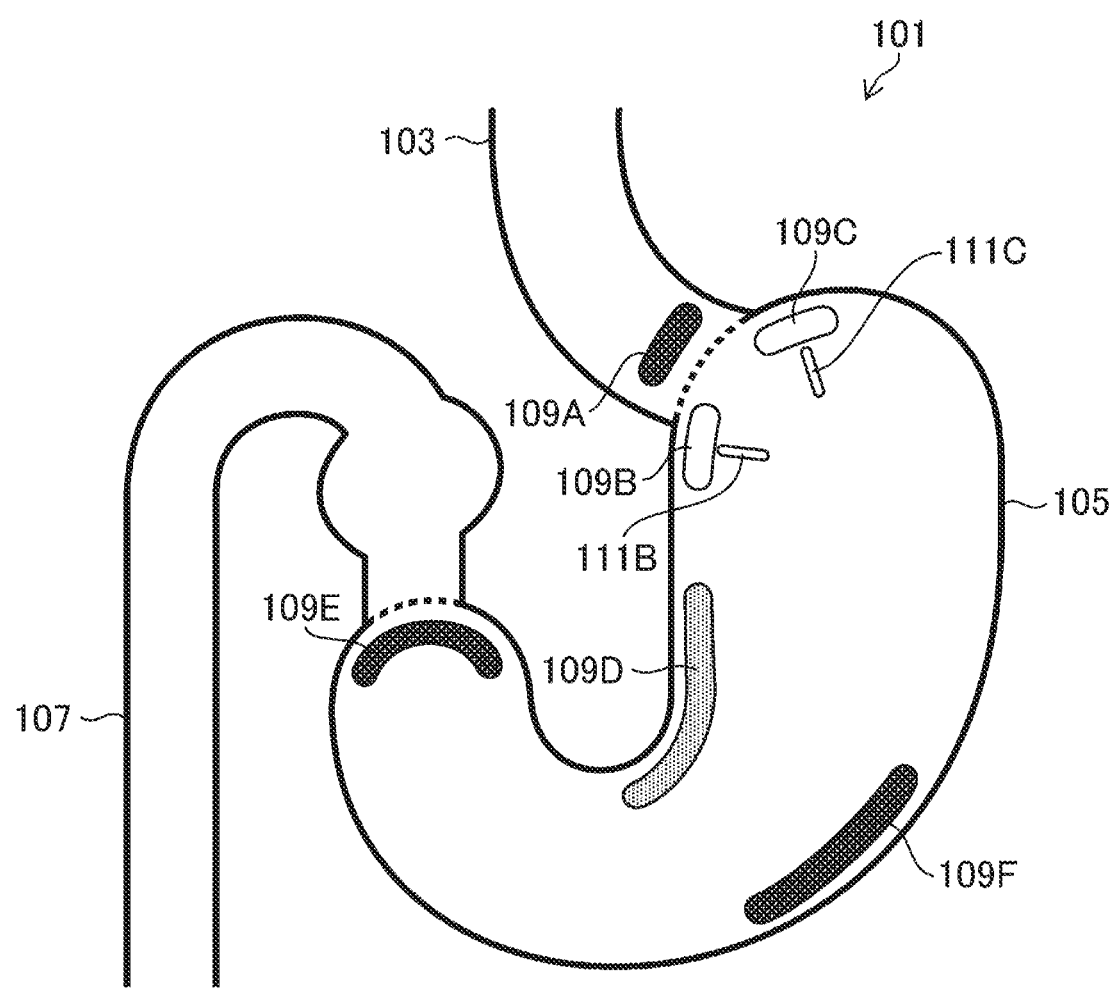
FIG. 11 is a diagram illustrating highlighting of site indicators.

FIG. 11 is a diagram illustrating the highlighting of the site indicator.

On the schematic diagram 101, for the site indicator 109A, the site indicator 109E, and the site indicator 109F, imaging of the medical image satisfying the determination criterion is completed, and the notification indicator is displayed. In addition, the site indicator 109D is a site for which imaging of an image that satisfies the determination criterion is newly completed, and the site indicator 109D corresponding to this imaging target site is highlighted. Note that the display mode of the notification indicator for the site indicator 109A, the site indicator 109E, and the site indicator 109F is different from the display mode of the highlighting of the site indicator 109D. For example, the notification indicator and the highlighting have display modes that are different in color and brightness.

In this manner, by highlighting the site indicator for which imaging of the medical image satisfying the determination criterion is newly completed, the user can easily recognize the imaging target site for which imaging is newly completed. The duration of the highlighting is determined as a predetermined time, a time until the next medical image (still image 39) is captured, a time until it is determined in the first determination process that the next imaging target site is included in the medical image, a time until it is determined in the second determination process that the next determination criterion is satisfied, or a combination of these times.

Third Modification

Next, a third modification of the present embodiment will be described. In this example, in the first determination process, the notification indicator is also displayed for the site indicator corresponding to the imaging target site determined to be included in the medical image.

Figure 12:
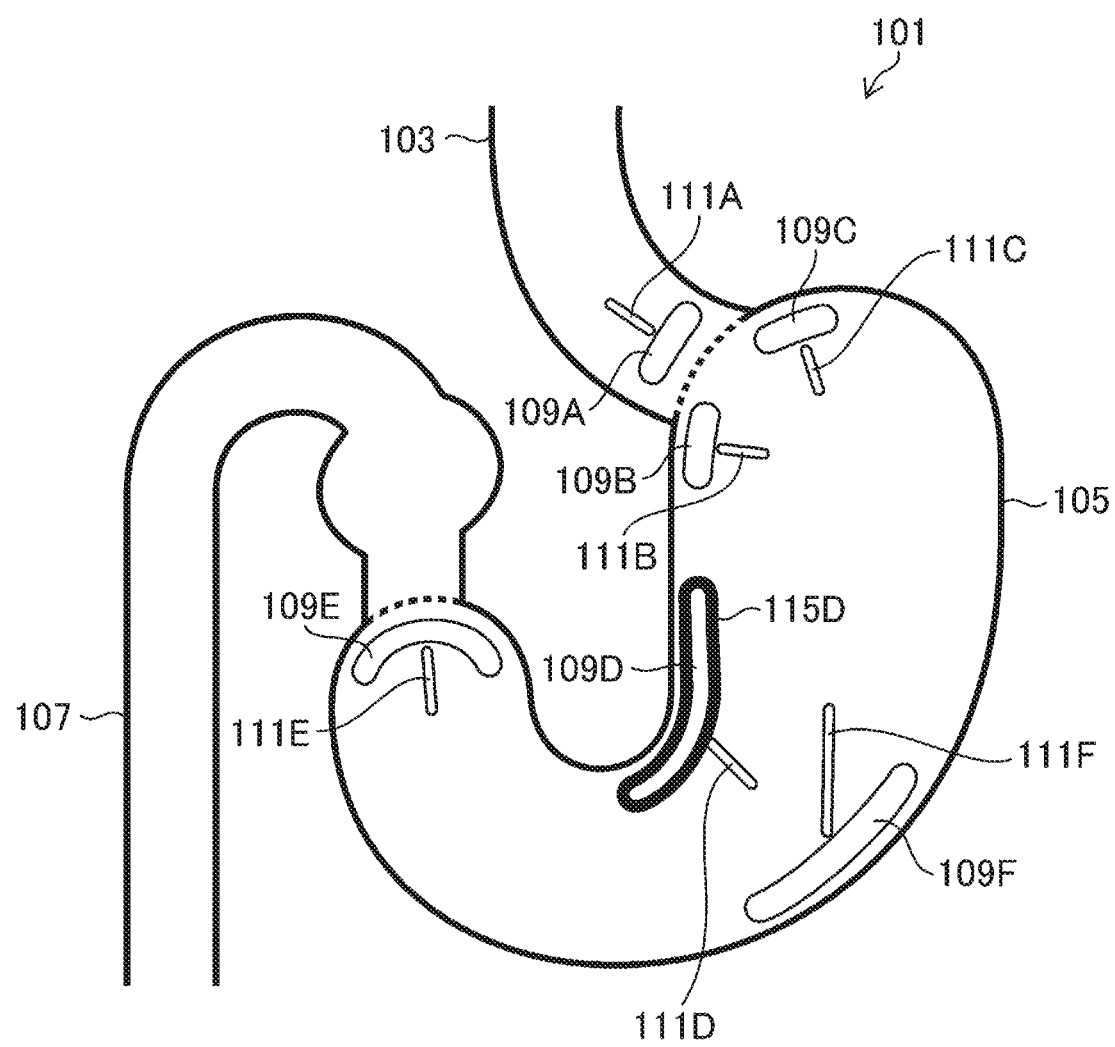
FIG. 12 is a diagram illustrating a display example of the schematic diagram.

FIG. 12 is a diagram illustrating a display example of the schematic diagram 101.

In the site indicator 109D on the schematic diagram 101, a first determination indicator 115D is displayed. The first determination indicator 115D is displayed so as to surround the outer shape of the site indicator 109D. The first determination indicator 115D is displayed if the first determiner 42 determines that the imaging target site corresponding to the site indicator 109D is included in the medical image. Similarly, in the other site indicators 109A to 109C, 109E, and 109F, if it is determined that the imaging target sites are included in the medical image, the first determination indicator is displayed. In this manner, by displaying the first determination indicator 115D indicating the detection in the first determination process, the user can recognize that at least the corresponding imaging target site is included in the medical image.

Fourth Modification

Next, a fourth modification of the present embodiment will be described. In this example, the schematic diagram 101 is superimposed and displayed within an examination screen.

Figure 13:
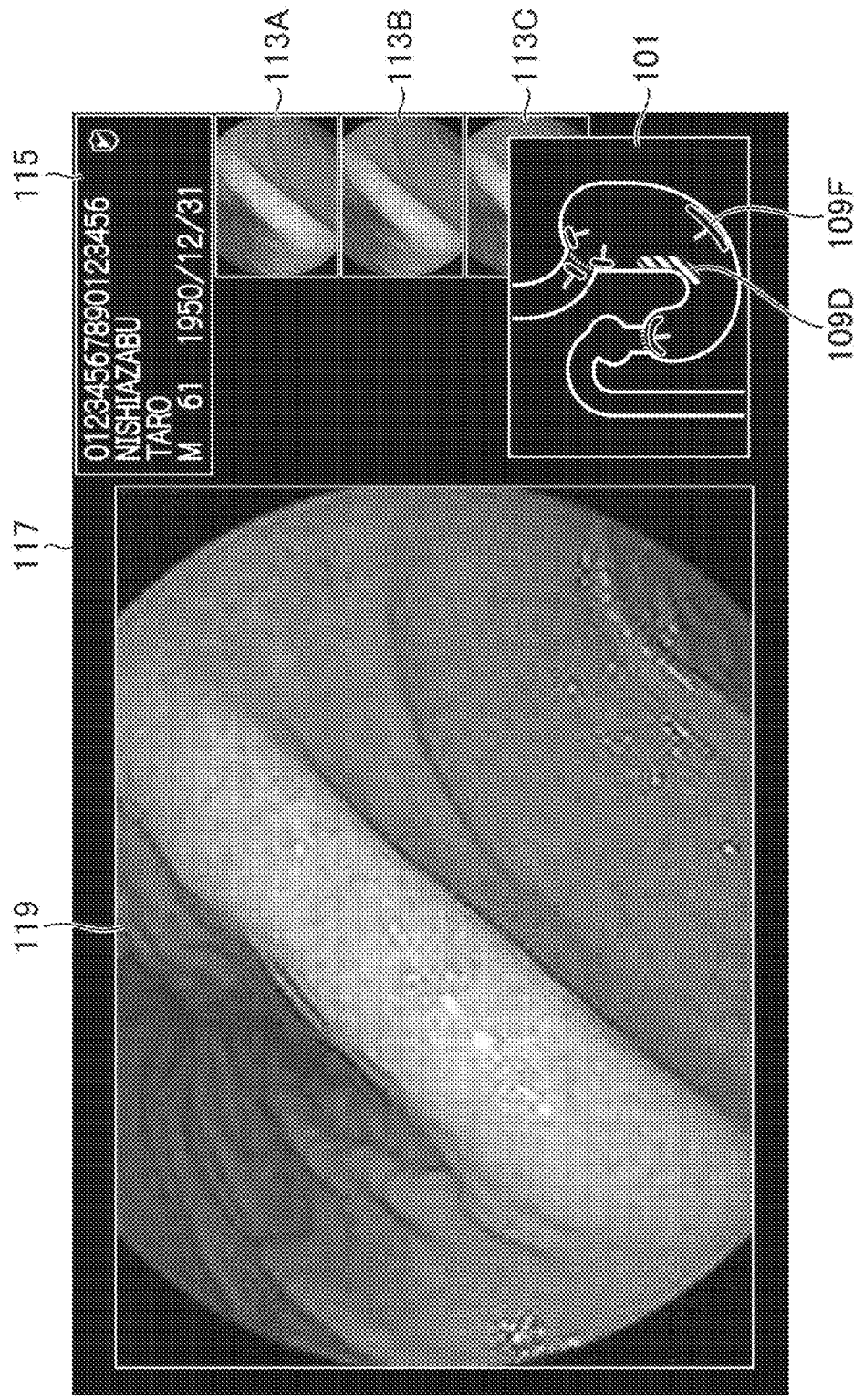
FIG. 13 is a diagram illustrating an examination screen displayed on the display unit.

FIG. 13 is a diagram illustrating an examination screen displayed on the display unit 16.

An examination screen 117 is a screen displayed on the display apparatus 13 and/or the display unit 16 when the user is performing an examination with the endoscope system 9. The user can easily obtain necessary information by checking the examination screen 117. The examination screen 117 includes a live view display 119, subject information 115, and recorded images 113A to 113C. The live view display 119 displays the real-time moving image 38 captured with the endoscope 10. The user operates the endoscope 10 while observing the live view display 119. The subject information 115 indicates the name, age, date of birth, sex, ID number, and the like of the subject undergoing the endoscopic examination. As the recorded images 113A to 113C, the still images 39 acquired by the still image capturing instruction unit 32 issuing an imaging instruction while the user is capturing the moving image 38 are displayed.

The schematic diagram 101 is superimposed and displayed on the examination screen 117. In the illustrated case, the schematic diagram 101 is superimposed and displayed at the lower right of the examination screen 117. On the schematic diagram 101, imaging of the site indicator 109D is completed last time, and the notification indicator is maintained. In the live view display 119, the imaging target site (the greater curvature in the lower body part from above) corresponding to the site indicator 109F is displayed. If an appropriate medical image of the imaging target site corresponding to the site indicator 109F is acquired, the notification indicator is displayed for the site indicator 109F. In this manner, by superimposing and displaying the schematic diagram 101 on the examination screen 117, the user can efficiently proceed with imaging of the imaging target site while observing the live view display 119.

Fifth Modification

Next, a fifth modification of the present embodiment will be described. In the above-described example, the case where the present invention is applied to the examination of the stomach has been described. In this example, the present invention is applied to an examination of a large intestine.

Figure 14:
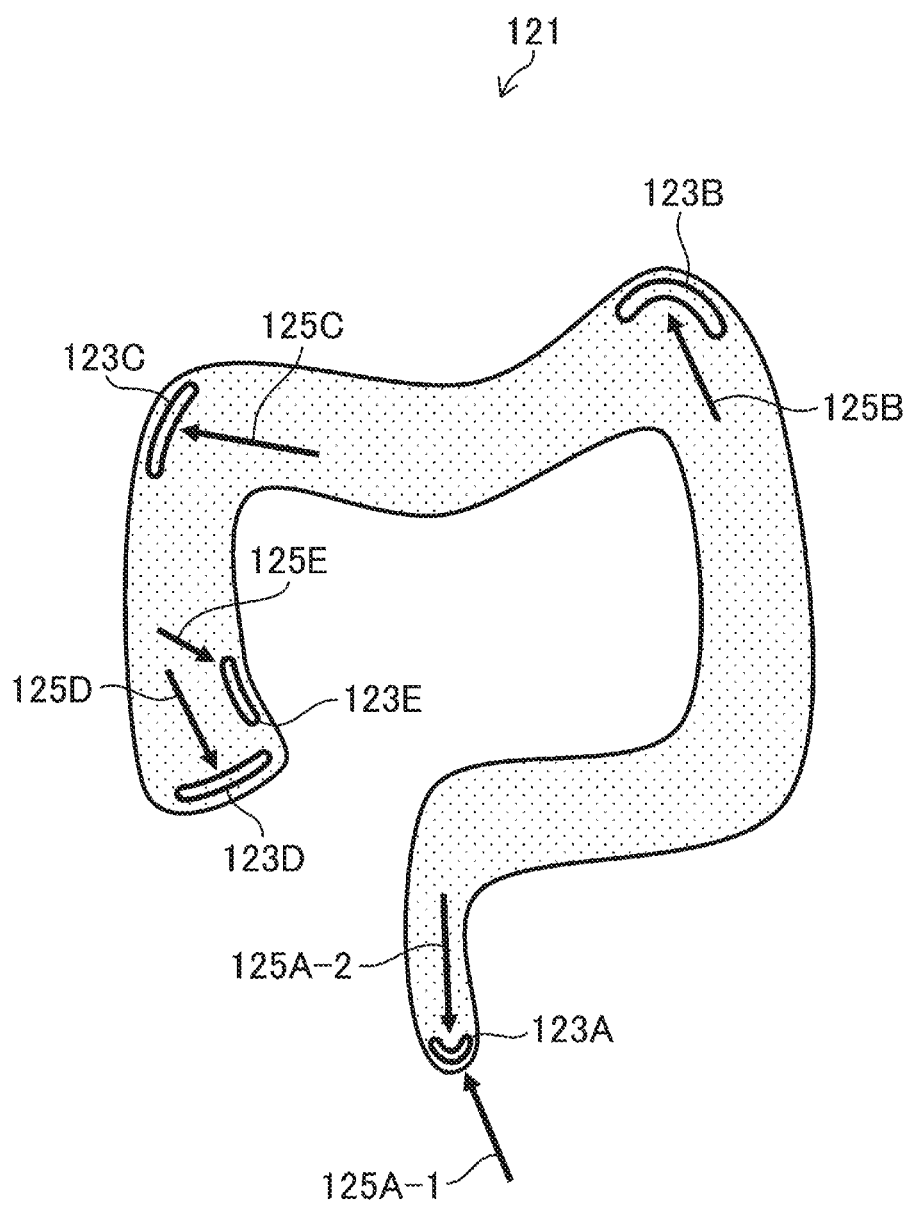
FIG. 14 is a diagram illustrating imaging target sites in a case of examining a large intestine.

FIG. 14 is a diagram illustrating imaging target sites in a case of examining the large intestine.

In FIG. 14, site indicators 123A to 123E indicating the imaging target sites and guide indicators 125A to 125E are illustrated on a schematic diagram 121 of the large intestine. The imaging target sites in this example are set to a "rectum" (indicated by reference numeral 125A-2) (corresponding site indicator 123A), an "anus" (indicated by reference numeral 125A-1) (corresponding site indicator 123A), a "splenic flexure" (corresponding site indicator 123B), a "hepatic flexure" (corresponding site indicator 123C), a "duodenal entrance" (corresponding site indicator 123E), and "ileocecal region" (corresponding site indicator 123D). In addition, arrow-shaped guide indicators 125A to 125E are indicated for the respective imaging target sites. The user can recognize the imaging direction of the endoscope 10 by the arrow-shaped guide indicators 125A to 125E. The guide indicator 125A-2 indicates the imaging direction of imaging of the "rectum". The guide indicator 125A-1 indicates the imaging direction of the "anus". The guide indicator 125B indicates the imaging direction of imaging of the "splenic flexure". The guide indicator 125C indicates the imaging direction of imaging of the "hepatic flexure". The guide indicator 125D indicates the imaging direction of imaging of the "ileocecal region". The guide indicator 125E indicates the imaging direction of imaging of the "duodenal entrance". In this manner, the present invention can also be applied to the large intestine by setting the imaging target sites. Also in this example, as in the above-described embodiment, if it is determined in the second determination process that the determination criterion is satisfied, the notification indicator is displayed for the site indicators 123A to 123E, and the notification indicator is maintained until imaging of all the imaging target sites is completed.

Sixth Modification

Next, a sixth modification will be described. In the above-described example, the still image 39 is input as a medical image, and the first determination process and the second determination process are performed based on the still image 39. In this example, a frame image 38a constituting the moving image 38 is input as a medical image, and is subjected to the first determination process and the second determination process. Subsequently, in this example, the frame image 38a satisfying the determination criterion of the second determination process is stored in the memory 48 as a recorded image.

Figure 15:
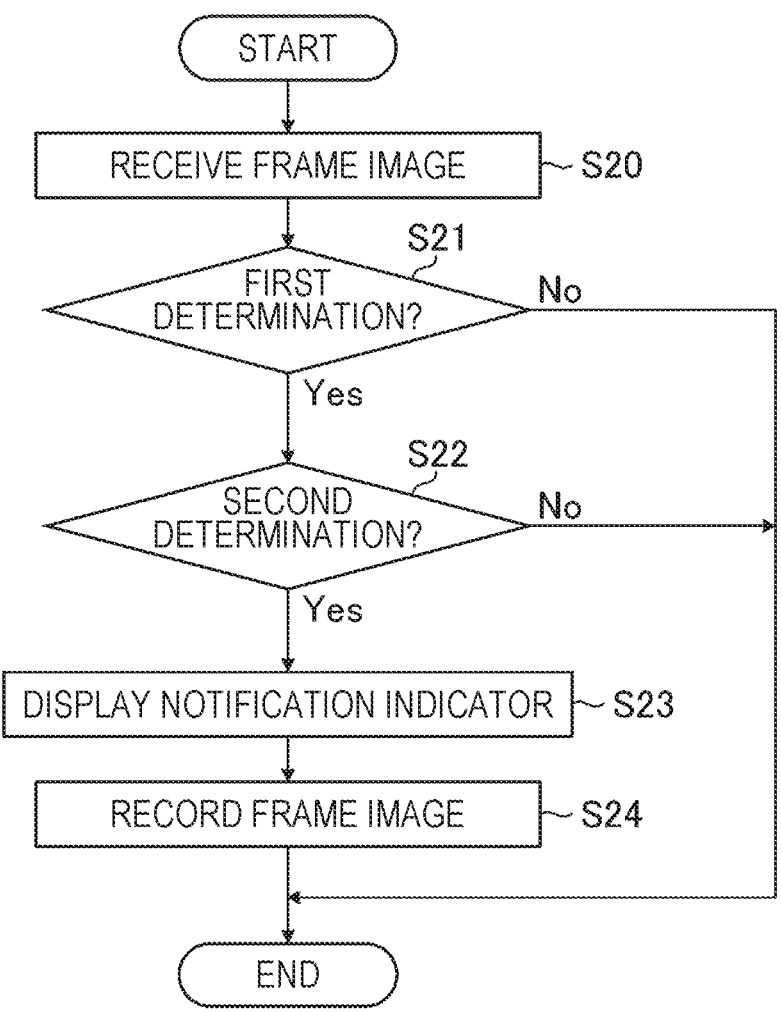
FIG. 15 is a flowchart illustrating a medical image processing method.

FIG. 15 is a flowchart illustrating a medical image processing method using the medical image processing apparatus 14.

First, the medical image acquisition unit 40 acquires the frame image 38a (step S20). Subsequently, the first determiner 42 performs the first determination process, based on the acquired frame image 38a (step S21: first determination step). Specifically, the first determiner 42 determines whether any of the plurality of imaging target sites is included in the frame image 38a. If the first determiner 42 determines that the frame image 38a does not include any imaging target sites (No in step S21), the second determiner 43 does not perform the determination.

On the other hand, if the first determiner 42 determines that the frame image 38a has any of the imaging target sites (Yes in step S21), the second determiner 43 performs the second determination process, based on the frame image 38a on which the first determination process is performed (step S22: second determination step). Specifically, the second determiner 43 determines whether the determination criterion set for the site determined by the first determiner 42 is satisfied. If the second determiner 43 determines that the determination criterion is not satisfied (No in step S22), the notification indicator is not displayed on the display unit 16.

On the other hand, if the second determiner 43 determines that the frame image 38a satisfies the determination criterion, the display control unit 46 displays the notification indicator on the display unit 16 (step S23: display control step). If it is determined in the second determination process that the determination criterion is satisfied, the processor stores the frame image 38a in the memory 48 as a recorded image (step S24: storage process). Note that the frame images 38a are continuously acquired in time series, and the above-described processes are sequentially performed on the acquired frame images 38a.

As described above, in this example, the frame image 38a is input, and, based on the input frame image 38a, the first determination process and the second determination process are performed. Subsequently, in the second determination process, the frame image 38a satisfying the determination criterion is stored in the memory 48 as a still image. Accordingly, a medical image satisfying the determination criterion can be efficiently acquired.

Seventh Modification

Next, a seventh modification of the present embodiment will be described. In this example, in accordance with the changing of light sources, the display mode of the schematic diagram is changed.

FIG. 16 is a diagram illustrating a schematic diagram in a case of using two different light sources.

In accordance with the changing of light sources, the display is switched between the schematic diagram 101 and a schematic diagram 131. In addition, the display may be switched between the schematic diagram 101 and the schematic diagram 131 in accordance with the light source of the medical image (the light source used when the medical image is captured).

The schematic diagram 101 (first display mode) is displayed on the display unit 16 when the first light source is used. Here, the first light source is a white light source, and is a light source that emits wide-band light. The white light source is a light source used in an examination using the normal endoscope system 9. The schematic diagram 131 (second display mode) is displayed on the display unit 16 when a medical image using the second light source is acquired. Here, the second light source is a special light source, and is a light source that emits narrow-band light. The special light source is a light source used when a specific site or a specific lesion is observed.

On the schematic diagram 101 displayed when the first light source is used, site indicators 109A to 109F at six sites are displayed as in the above description (see FIG. 8). In a case where the first light source is used, the first determination process and the second determination process are performed on the imaging target sites corresponding to the site indicators 109A to 109F. In the illustrated case, the notification indicator is displayed for the site indicator 109A and the site indicator 109C.

When the second light source is used, the imaging target site is one site, which is the "esophagogastric junction". On the schematic diagram 131 displayed when the second light source is used, only the site indicator 109A corresponding to the "esophagogastric junction" is displayed. In addition, on the schematic diagram 131, the stomach 105, which is a region in which the imaging target sites are not set, is displayed in a color (for example, gray) different from that of other regions. In the schematic diagram 131, the site indicators 109B to 109F, which are not the imaging target sites in a case of using the second light source, are not displayed. Accordingly, the schematic diagram 131 can indicate the range of the imaging target site in a case of using the second light source (the range in which the first determination process and the second determination process are performed).

In the above-described example, an example has been described in which five imaging target sites among six imaging target sites are determination targets only when imaging is performed using the first light source, and the other one imaging target site ("esophagogastric junction") is an imaging target site when imaging is performed using the first light source or the second light source. That is, in this example, an example in which the number of imaging target sites is reduced in a case of a medical image captured using a narrow-band light source as compared with a wide-band light source has been described. However, if an appropriate light source is determined for the imaging target site, the imaging target site may be set in accordance with the light source.

Next, display variations of the schematic diagram 101 and the schematic diagram 131 displayed in accordance with the type of the above-described light source will be described.

Figure 17:
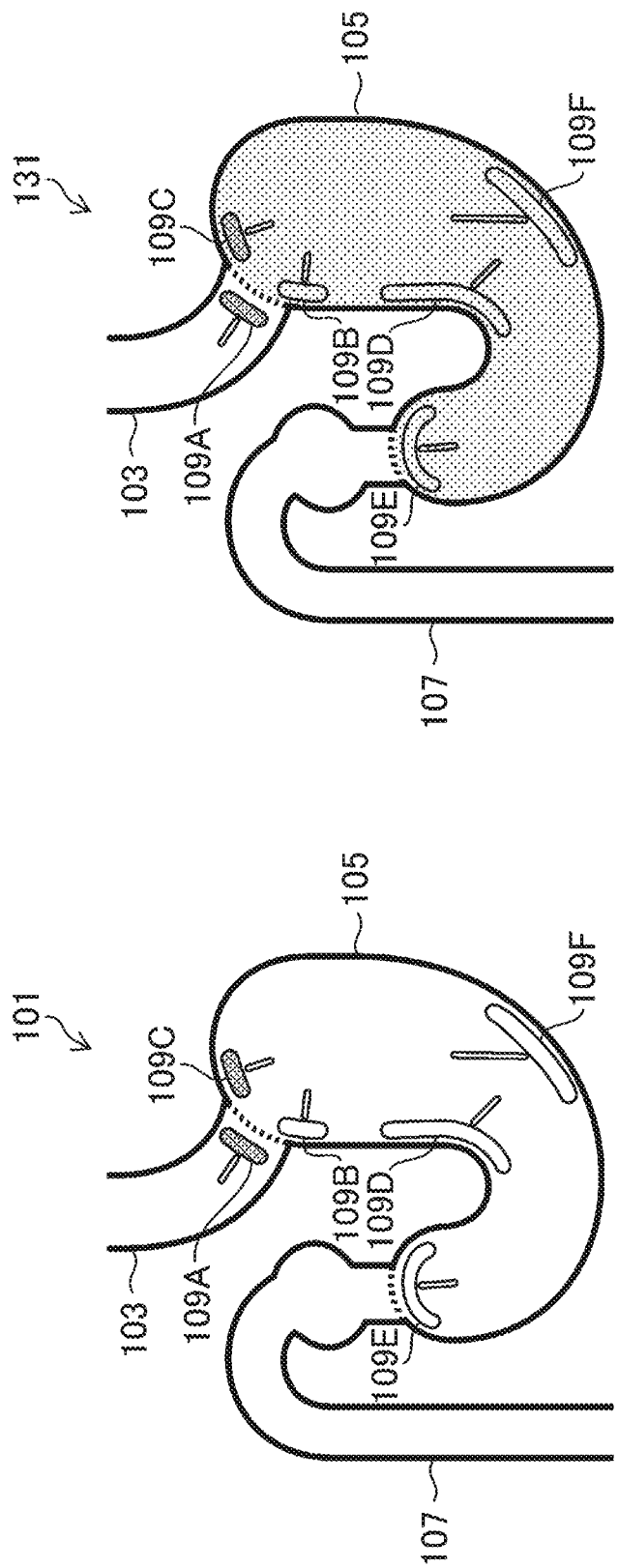
FIG. 17 is a diagram illustrating a first example of a display variation.

FIG. 17 is a diagram illustrating a first example of the display variation.

In this example, on the schematic diagram 131 described in FIG. 16, the site indicators 109B to 109F outside the range of the imaging target site are also displayed. Specifically, on the schematic diagram 131, the site indicators 109A to 109F are displayed in the same manner as in the schematic diagram 101. On the other hand, on the schematic diagram 131, the stomach 105, which is a region in which the imaging target sites are not set, is displayed in a color (for example, gray) different from that of other regions, and this indicates that the stomach 105 is outside the range of the imaging target site. Note that, in this example, by displaying all the site indicators 109A to 109F, it is possible to maintain the notification indicator at the time of using the first light source. For example, the notification indicator is displayed for the site indicator 109C on the schematic diagram 131 in a manner that the notification indicator displayed when imaging is performed using the first light source and a medical image satisfying the determination criterion is acquired is maintained.

FIG. 18 is a diagram illustrating a second example of the display variation.

In this example, the range of the imaging target site is indicated by the display mode of the site indicators 109A to 109F. Specifically, on the schematic diagram 131, the site indicator 109A is indicated by a solid line, and the site indicators 109B to 109F are indicated by dotted lines. This can indicate that the range including the site indicator 109A (the esophagus 103) is the range of the imaging target site, and that the range including the site indicators 109B to 109F (the stomach 105) is outside the range of the imaging target site.

FIG. 19 is a diagram illustrating a third example of the display variation.

In this example, the range of the imaging target sites that changes depending on the light source is indicated by changing the display of the range of the imaging target sites. Specifically, when the first light source is used, the imaging target sites are the "esophagogastric junction", the "lesser curvature J-turn immediately below the cardia", and the "greater curvature U-turn immediately below the cardia". Furthermore, on the schematic diagram 101, a range 133(A) including the site indicators 109A to 109C corresponding to the "esophagogastric junction", the "lesser curvature J-turn immediately below the cardia", and the "greater curvature U-turn immediately below the cardia" and another range 133(B) are displayed in different colors. In addition, when the second light source is used, the imaging target sites are the "lesser curvature posterior wall J-turn from the angulus or lower body part", the "pyloric ring from the prepyloric region", and the "greater curvature in the lower body part from above". Furthermore, on the schematic diagram 131, the range 133(B) including the site indicators 109D to 109F corresponding to the "lesser curvature posterior wall J-turn from the angulus or lower body part", the "pyloric ring from the prepyloric region", and the "greater curvature in the lower body part from above" and the other range 133(A) are displayed in different colors. In this manner, the schematic diagram 101 and the schematic diagram 131 can indicate the range of the imaging target sites that changes depending on the light source.

FIG. 20 is a diagram illustrating a fourth example of the display variation.

In this example, a medical image satisfying the determination criterion is acquired using each of the first light source and the second light source. Specifically, in this example, the first light source and the second light source are used to capture an image of the "esophagogastric junction", which is the imaging target site, satisfying the determination criterion in the second determination process.

On the schematic diagram 101 displayed when the first light source is used, the notification indicator is displayed for the site indicator 109A. That is, acquisition of the medical image satisfying the determination criterion of the "esophagogastric junction" (the imaging target site corresponding to the site indicator 109A) using the first light source is completed. Subsequently, when the light source is switched from the first light source to the second light source, the schematic diagram 131 is displayed. On the schematic diagram 131, the site indicator 109A within the range of the imaging target site is displayed as described in FIG. 16. Since a medical image satisfying the determination criterion of the "esophagogastric junction" using the second light source is yet to be acquired, the notification indicator is not displayed for the site indicator 109A on the schematic diagram 131. Subsequently, when imaging of the medical image satisfying the determination criterion of the "esophagogastric junction" using the second light source is completed, the notification indicator is displayed for the site indicator 109A. Accordingly, it is possible to efficiently capture a medical image satisfying the determination criterion of the "esophagogastric junction" using the first light source and the second light source.

Miscellaneous

In the above-described embodiment, the hardware configurations of the processing units (for example, the medical image acquisition unit 40, the first determiner 42, the second determiner 43, the display control unit 46, and the sound control unit 47) that execute various processes are various processors as described below. Various processors include a central processing unit (CPU), which is a general-purpose processor that executes software (program) and functions as various processing units, a programmable logic device (PLD), which is a processor in which the circuit configuration is changeable after manufacture, such as field programmable gate array (FPGA), a dedicated electric circuit, which is a processor having a circuit configuration that is specially designed to execute specific processing, such as an application specific integrated circuit (ASIC), and the like.

One processing unit may be constituted by one of these various processors, or may be constituted by two or more processors of the same type or different types (e.g., a combination of a plurality of FPGAs or a combination of a CPU and an FPGA). In addition, a plurality of processing units may be constituted by one processor. As examples for constituting a plurality of processing units by one processor, firstly, there is a form in which one or more CPUs and software are combined to constitute one processor, and this processor functions as a plurality of processing units, as typified by a computer such as a client or a server. Secondly, there is a form of using a processor that implements the functions of the entire system including a plurality of processing units using one integrated circuit (IC) chip, as typified by a system on chip (SoC) or the like. In this manner, various processing units are constituted by one or more of the above various processors in terms of hardware configuration.

More specifically, the hardware configuration of these various processors is electric circuitry constituted by combining circuit elements such as semiconductor elements.

The above-described configurations and functions can be implemented as appropriate by given hardware, given software, or a combination of both. For example, the present invention can also be applied to a program for causing a computer to execute the above-described processing steps (processing procedure), a computer-readable recording medium (non-transitory recording medium) on which such a program is recorded, or a computer in which such a program can be installed.

Although examples of the present invention have been described above, the present invention is not limited to the above-described embodiment, and it is needless to say that various modifications can be made without departing from the spirit of the present invention.

REFERENCE SIGNS LIST 9 endoscope system
10 endoscope
11 light source apparatus
12 endoscope processor apparatus
13 display apparatus
14 medical image processing apparatus
15 operating unit
16 display unit
17 speaker
20 insertion part
21 handheld operating unit
22 universal cord
25 soft part
26 bending part
27 tip part
28 imaging element
29 bending operation knob
30 air/water supply button
31 suction button
32 still image capturing instruction unit
33 treatment tool introduction port
35 light guide
36 signal cable
37a connector
37b connector
38 moving image
38a frame image
39 still image
40 medical image acquisition unit
41 CPU
42 first determiner
43 second determiner
46 display control unit
47 sound control unit
48 memory

What is claimed is:

1. A medical image processing apparatus comprising one or more processors configured to perform:
a first determination process of determining, based on an acquired medical image, whether any of a plurality of imaging target sites is included in the medical image;
a second determination process of determining, if it is determined in the first determination process that any of the plurality of imaging target sites is included in the medical image, whether the medical image is an image satisfying a determination criterion corresponding to each of the plurality of imaging target sites; and
a display control process of displaying, if it is determined in the second determination process that the medical image is the image satisfying the determination criterion corresponding to each of the plurality of imaging target sites, a notification indicator on a display unit, the notification indicator indicating that the image satisfying the determination criterion corresponding to each of the plurality of imaging target sites is captured, wherein in the display control process, a schematic diagram illustrating a luminal organ and the notification indicator corresponding to each of the plurality of imaging target sites are displayed.

2. The medical image processing apparatus according to claim 1, wherein, in the display control process, the displaying of the notification indicator is maintained until the notification indicator for all the plurality of imaging target sites is displayed.

3. The medical image processing apparatus according to claim 1, wherein, in the second determination process, determination is performed based on the determination criterion different for each of the plurality of imaging target sites.

4. The medical image processing apparatus according to claim 1, wherein the second determination process is performed based on a plurality of indices and is performed based on determination results using the plurality of indices.

5. The medical image processing apparatus according to claim 4, wherein the plurality of indices include at least one of out-of-focus/blurring determination, brightness determination, boundary visibility determination, cardia visibility determination, cardia distance determination, peristalsis determination, fold determination, treatment determination, or composition determination.

6. The medical image processing apparatus according to claim 1, wherein, in the second determination process, determination is performed by a determiner different for each of the plurality of imaging target sites.

7. The medical image processing apparatus according to claim 1, wherein
the first determination process is performed based on a determination result of a first determiner constituted by a convolutional neural network, and
at least a part of the second determination process is performed by inputting an intermediate feature amount acquired by the first determiner to a second determiner and outputting a determination result by the second determiner.

8. The medical image processing apparatus according to claim 1, wherein
the medical image is captured using a first light source or a second light source, and
in the first determination process, if determination is performed on the medical image captured using the first light source, the determination is performed on the plurality of imaging target sites, and if determination is performed on the medical image captured using the second light source, the determination is performed on an imaging target site selected from the plurality of imaging target sites.

9. The medical image processing apparatus according to claim 1, wherein
the medical image is an endoscopic image captured with an endoscope.

10. The medical image processing apparatus according to claim 9, wherein, in the display control process, a guide indicator for guiding imaging with the endoscope for capturing the medical image is displayed on the schematic diagram.

11. The medical image processing apparatus according to claim 10, wherein the guide indicator has a stick shape, an imaging direction of the endoscope is indicated by a direction of the stick shape, and a distance of the endoscope from a subject is indicated by a length of the stick shape.

12. The medical image processing apparatus according to claim 1, wherein, in the display control process, site indicators of the plurality of imaging target sites are displayed at corresponding positions on the schematic diagram.

13. The medical image processing apparatus according to claim 12, wherein, if it is determined in the second determination process that the medical image is the image satisfying the determination criterion corresponding to each of the plurality of imaging target sites, in the display control process, the notification indicator is displayed by changing a display form of the site indicator for each of the plurality of imaging target sites.

14. The medical image processing apparatus according to claim 1, wherein
the medical image is captured using a first light source or a second light source, and
in the display control process, if the medical image captured using the first light source is acquired, the schematic diagram is displayed in a first display mode, and if the medical image captured using the second light source is acquired, the schematic diagram is displayed in a second display mode.

15. The medical image processing apparatus according to claim 1, wherein, if it is determined in the second determination process that the medical image is an image satisfying the determination criterion corresponding to each of the plurality of imaging target sites, in the display control process, information is displayed on the display unit, the information indicating that imaging of all the imaging target sites is completed.

16. The medical image processing apparatus according to claim 1, wherein
the processor is configured to perform a storage process of storing the medical image in a memory if it is determined in the second determination process that the medical image is the image satisfying the determination criterion corresponding to each of the plurality of imaging target sites.

17. The medical image processing apparatus according to claim 1, wherein the plurality of imaging target sites are selected from at least an esophagogastric junction, a lesser curvature J-turn immediately below a cardia, a greater curvature U-turn immediately below the cardia, a lesser curvature posterior wall J-turn from an angulus or a lower body part, a pyloric ring from a prepyloric region, and a greater curvature in the lower body part from above.

18. The medical image processing apparatus according to claim 1, wherein the plurality of imaging target sites are selected from at least a rectum, an anus, a splenic flexure, a hepatic flexure, a duodenal entrance, and ileocecal region.

19. A medical image processing method for a medical image processing apparatus comprising one or more processors, the method comprising:
performing, by the one or more processors,
a first determination step of determining, based on an acquired medical image, whether any of a plurality of imaging target sites is included in the medical image;
a second determination step of determining, if it is determined in the first determination step that any of the plurality of imaging target sites is included in the medical image, whether the medical image is an image satisfying a determination criterion corresponding to each of the plurality of imaging target sites; and
a display control step of displaying, if it is determined in the second determination step that the medical image is the image satisfying the determination criterion corresponding to each of the plurality of imaging target sites, a notification indicator on a display unit, the notification indicator indicating that the image satisfying the determination criterion corresponding to each of the plurality of imaging target sites is captured, wherein
in the display control process, a schematic diagram illustrating a luminal organ and the notification indicator corresponding to each of the plurality of imaging target sites are displayed.

20. A non-transitory, computer-readable tangible recording medium on which a program for causing, when read by a computer, the computer to execute:
a first determination step of determining, based on an acquired medical image, whether any of a plurality of imaging target sites is included in the medical image;
a second determination step of determining, if it is determined in the first determination step that any of the plurality of imaging target sites is included in the medical image, whether the medical image is an image satisfying a determination criterion corresponding to each of the plurality of imaging target sites; and
a display control step of displaying, if it is determined in the second determination step that the medical image is the image satisfying the determination criterion corresponding to each of the plurality of imaging target sites, a notification indicator on a display unit, the notification indicator indicating that the image satisfying the determination criterion corresponding to each of the plurality of imaging target sites is captured, wherein
in the display control process, a schematic diagram illustrating a luminal organ and the notification indicator corresponding to each of the plurality of imaging target sites are displayed.

* * * * *